(12) United States Patent
Inoue et al.

(10) Patent No.: US 7,305,902 B2
(45) Date of Patent: Dec. 11, 2007

(54) BALL SCREW DEVICE

(75) Inventors: Masahiro Inoue, Osaka (JP); Isao Usuki, Osaka (JP)

(73) Assignee: JTEKT Corporation, Osaka (JP)

( * ) Notice: Subject to any disclaimer, the term of this patent is extended or adjusted under 35 U.S.C. 154(b) by 318 days.

(21) Appl. No.: 10/488,601

(22) PCT Filed: Sep. 11, 2002

(86) PCT No.: PCT/JP02/09264

§ 371 (c)(1),
(2), (4) Date: Feb. 27, 2004

(87) PCT Pub. No.: WO03/025429

PCT Pub. Date: Mar. 27, 2003

(65) Prior Publication Data
US 2004/0237685 A1    Dec. 2, 2004

(30) Foreign Application Priority Data
Sep. 12, 2001 (JP) ............................ 2001-276195
Sep. 21, 2001 (JP) ............................ 2001-288129
Sep. 21, 2001 (JP) ............................ 2001-288630

(51) Int. Cl.
*F16H 25/22* (2006.01)
(52) U.S. Cl. ................. 74/424.85; 74/424.86
(58) Field of Classification Search ............. 74/424.85, 74/424.86
See application file for complete search history.

(56) References Cited

U.S. PATENT DOCUMENTS

| 3,244,022 A | * | 4/1966 | Wysong, Jr. ............. 74/424.75 |
| 3,537,666 A | * | 11/1970 | Lewis ....................... 242/375 |
| 4,070,921 A | | 1/1978 | Arnold |
| 5,358,265 A | * | 10/1994 | Yaple ........................ 280/293 |
| 2003/0051569 A1 | * | 3/2003 | Kapaan et al. ........... 74/424.85 |

FOREIGN PATENT DOCUMENTS

| JP | 59-59556 | | 4/1984 |
| JP | 2000-18360 A | * | 1/2000 |

* cited by examiner

*Primary Examiner*—William C. Joyce
(74) *Attorney, Agent, or Firm*—Jordan and Hamburg LLP

(57) ABSTRACT

A ball screw device comprises a screw shaft, a nut externally mounted on the screw shaft, and a multiplicity of balls interposed between thread grooves of the screw shaft and the nut. The screw shaft has a ball circulation groove for coupling downstream and upstream sides of the thread groove so that the balls are returned from the downstream side to the upstream side and thereby circulated in the thread groove of the screw shaft. The ball circulation groove has such a curved shape as to sink radially inward in an intermediate region in a rolling direction of the balls and has a curved shape protruding radially outward in both end regions, and is configured in the manner that the centrodes of the balls rolling in the both end regions and the balls rolling in the thread groove of the screw shaft satisfy predetermined conditions with respect to circulation of the balls.

20 Claims, 21 Drawing Sheets

F I G. 8
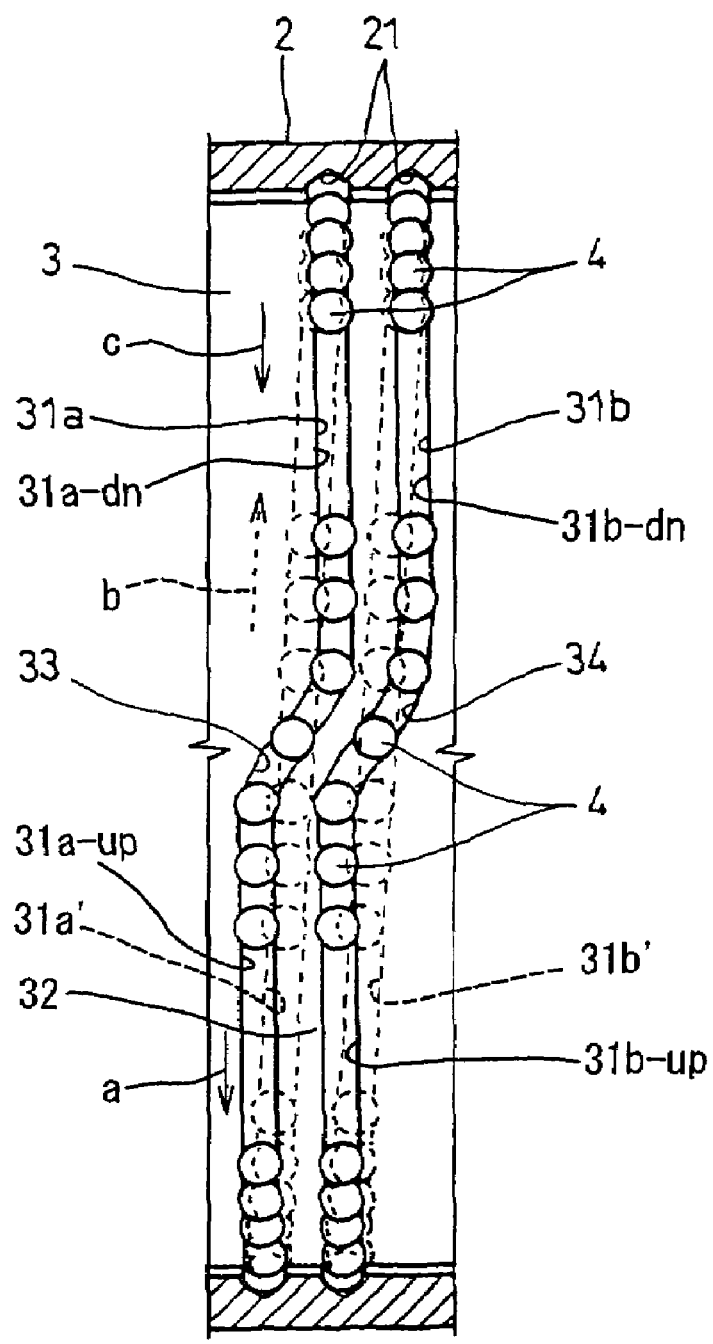

F I G. 9
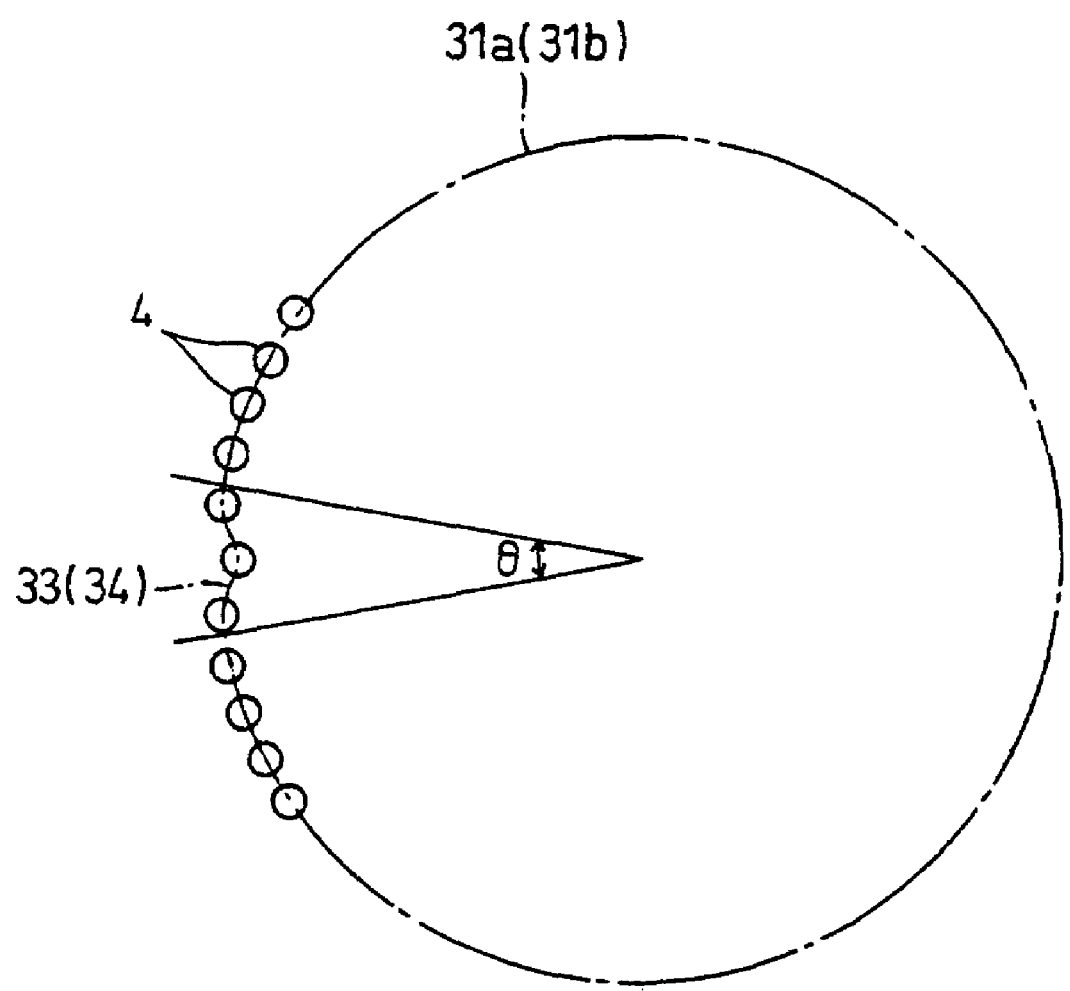

F I G. 1 8
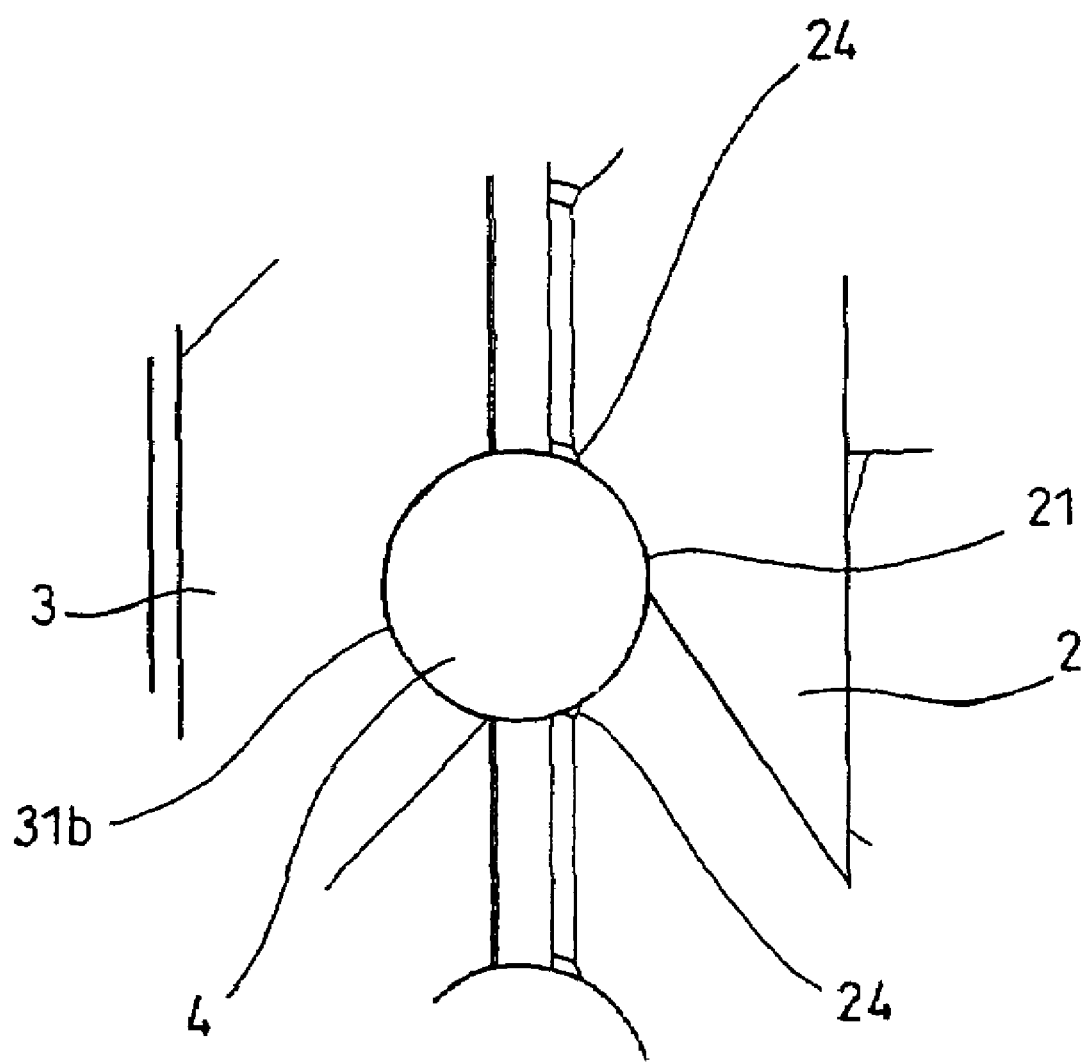

BALL SCREW DEVICE

TECHNICAL FIELD

This invention relates to a ball screw device of ball circulation type.

BACKGROUND TECHNIQUE

A ball screw device, in general, comprises a screw shaft having a thread groove in the outer peripheral surface thereof, a nut having a thread groove in the inner peripheral surface thereof and externally mounted on the screw shaft, and a multiplicity of balls interposed between the respective thread grooves of the screw shaft and the nut. The balls, in accordance with the rotation of the nut or the screw shaft, circulate between the respective thread grooves, which thereby causes a relative telescopic motion between the nut and the screw shaft. The balls, due to the circulation thereof, require preventive measures not to slip out of between the respective thread grooves. As a ball circulation mechanism capable of preventing the slip-out of balls, a ball screw device having an externally mounted part for circulating balls, that is a so-called deflector, is available. The deflector is described below.

The deflector, in general, serves to couple the upstream side of the thread groove, which balls are rolled from, and the downstream side thereof, which the balls are rolled to, so that the balls on the downstream side of the thread groove are returned to the upstream side thereof over a ridge. The deflector is, being fitted into a radial through hole formed on a nut, fixed to the through hole by an adhesive. The deflector has, in the inner diameter surface thereof, a ball circulation groove for returning the balls, over the ridge, to the upstream side from the downstream side in substantially one turn of the thread grooves over the ridge.

Such a ball screw device requires an externally mounted part, that is the deflector, which generates additional costs for the deflector, processing the through hole for mounting the deflector to a nut and mounting the deflector to the nut. Besides, when the deflector is mounted to the through hole of the nut rather imprecisely, the ball circulation groove and thread groove cannot be precisely positioned, which results in a degraded circulation performance of the balls. Thus, mounting the deflector requires precision, which is costly. For these reasons, it has been desirable to develop a ball screw device capable of circulating balls smoothly without using the deflector.

Therefore, a main object of the present invention is to provide a ball screw device capable of circulating balls without using a deflector.

DISCLOSURE OF THE INVENTION

A ball screw device according to the present invention comprises a screw shaft having at least one thread groove of substantially one turn provided in the outer peripheral surface thereof, a nut externally mounted on the screw shaft and having a thread groove provided in the inner peripheral surface thereof at a lead angle substantially identical to the angle of the thread groove, and a plurality of balls interposed between the respective thread grooves. In the screw shaft is provided a ball circulation groove for coupling the downstream and upstream sides of the thread groove so that the balls on the downstream side are returned to the upstream side to be thereby circulated in the thread groove of the screw shaft. The ball circulation groove has, in the ball rolling direction, an intermediate region having a shape curved to sink radially inward and two end side regions having a predetermined shape and positioned on respective sides of the intermediate region. Further, the ball circulation groove is configured in the manner that the centrode of the balls rolling in the end side regions and the centrode of the balls rolling in the thread groove of the screw shaft satisfy predetermined conditions in relation to circulation of the balls.

According to the present invention, the ball circulation groove, instead of the deflector, is provided in the screw shaft. The ball circulation groove circulates the balls, wherein such an externally mounted part as the deflector or the like is dispensed with. As a result of that, such working steps as forming a through hole for fitting the deflector to the nut and mounting the deflector thereto are no longer necessary. The intermediate region of the ball circulation groove in the ball rolling direction is formed in such a shape as to sink radially inward, and therefore the balls interposed between the respective thread grooves of the screw shaft and the nut are smoothly circulated via the ball circulation groove.

In a preferred embodiment of the present invention, the predetermined conditions are: an angle, at which a tangent line obtained at an intersection point of a small arc formed by the centrode of the balls rolling in the both end side regions of the ball circulation groove with respect to a large arc formed by the centrode of the balls rolling in the thread grooves of the screw shaft intersects with a tangent line obtained at the intersection point with respect to the small arc, is set at greater than 0 degree and at most 30 degrees. Under the conditions, the balls can enter and exit with an optimum smoothness between the thread groove of the screw shaft and ball circulation groove to be thereby circulated.

In a more preferred embodiment of the present invention, the both end side regions of the ball circulation groove have a shape protruding radially outward In a more preferred embodiment of the present invention, substantially one turn each of two thread grooves are independently provided in the screw shaft, and in the thread grooves of the screw shaft are respectively provided two ball circulation grooves, corresponding to the respective thread grooves of the screw shaft, for separately coupling the downstream and upstream sides of the thread grooves. The respective ball circulation grooves are axially disposed in a substantially identical phase.

In a more preferred embodiment of the present invention, a retainer ring for rotatably retaining the balls is mounted on the outer periphery of the screw shaft so as to relatively rotate with respect to the screw shaft and in an axially fixed position.

In a more preferred embodiment of the present invention, the thread grooves of the screw shaft, the thread groove of the nut and the ball circulation grooves are of Gothic arc shape in section.

In a more preferred embodiment of the present invention, in the side edges of the thread groove of the nut is formed a chamfer for avoiding contact with the balls entering and exiting the ball circulation grooves.

BRIEF DESCRIPTION OF THE DRAWINGS

FIG. 8 is a side view schematically showing ball circulation passageways.

FIG. 9 is a front view of the ball circulation passageways shown in FIG. 8.

FIG. 18 is an enlarged view corresponding to XI portion shown in FIG. 4 according to the embodiment of the present invention shown in FIG. 17.

BEST MODE FOR EXECUTING THE INVENTION

Figure 1:
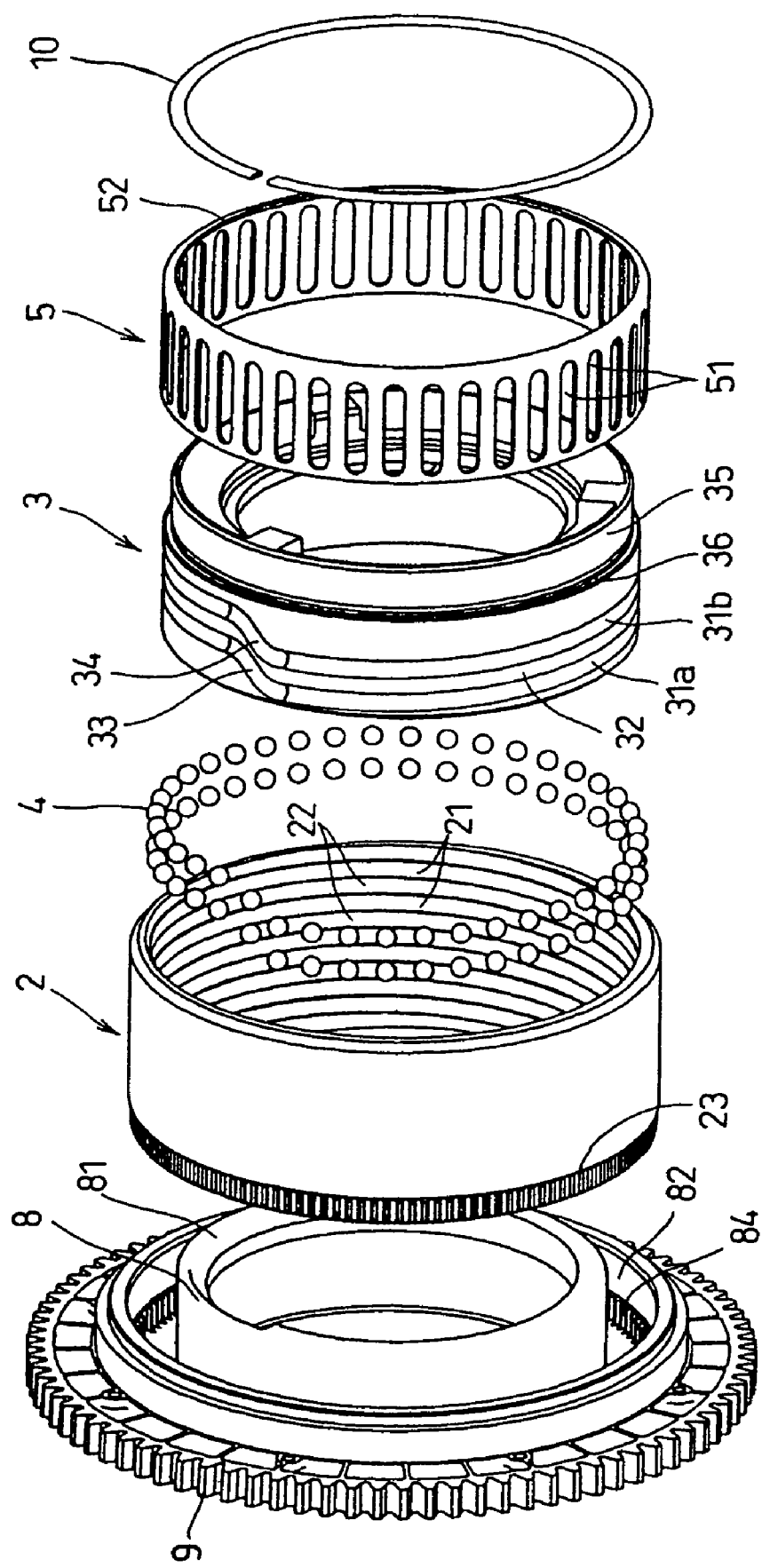
FIG. 1 is a perspective view of a disassembled ball screw device according to a best mode for executing the present invention.
Figure 2:
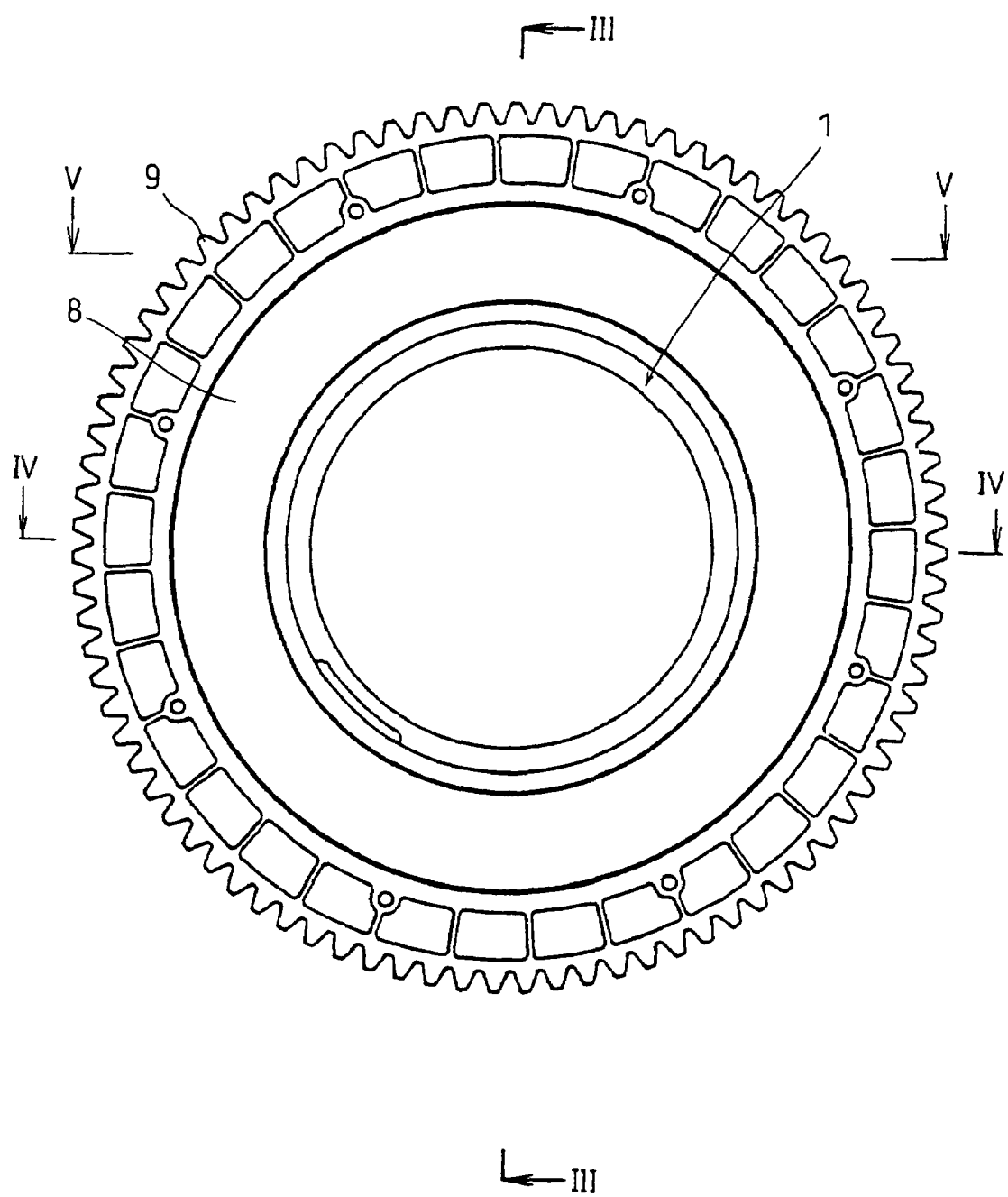
FIG. 2 is a front view of the ball screw device shown in FIG. 1.

Referring to FIGS. 1 through 12, a ball screw device according to a best mode for executing the present invention is hereinafter described in detail. A ball screw device 1 comprises a nut 2, a screw shaft 3, a multiplicity of balls 4 and a retainer ring 5. The nut 2 has a single thread groove 21 continuous from one shaft end to another shaft end formed in the inner peripheral surface thereof. The screw shaft 3 has substantially one turn each of two independent thread grooves 31a and 31b formed in the outer peripheral surface thereof.

Figure 3A:
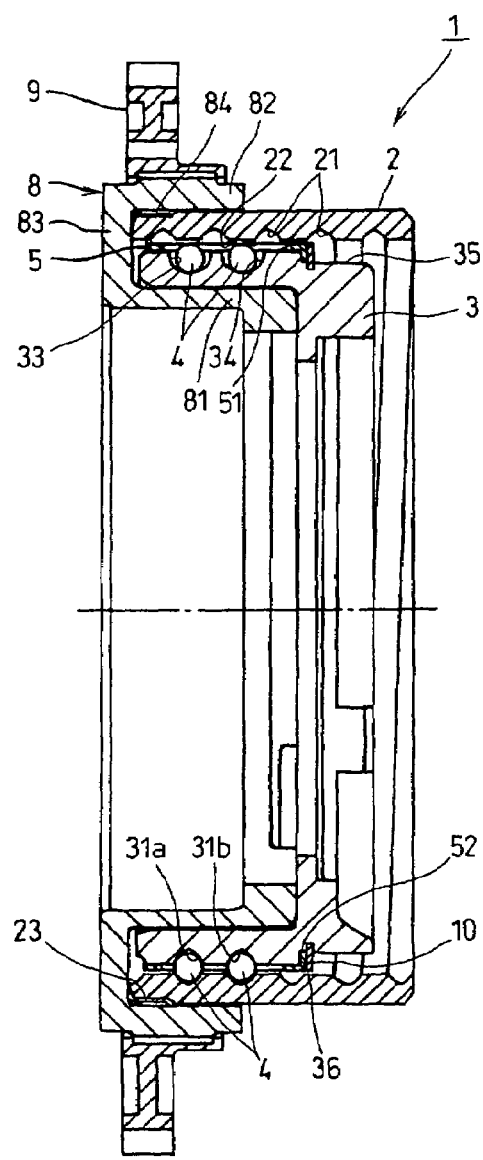
FIG. 3A is a side view in section showing a nut and a screw shaft having been relatively drawn in toward one another and taken along III-III line of FIG. 2.
Figure 3B:
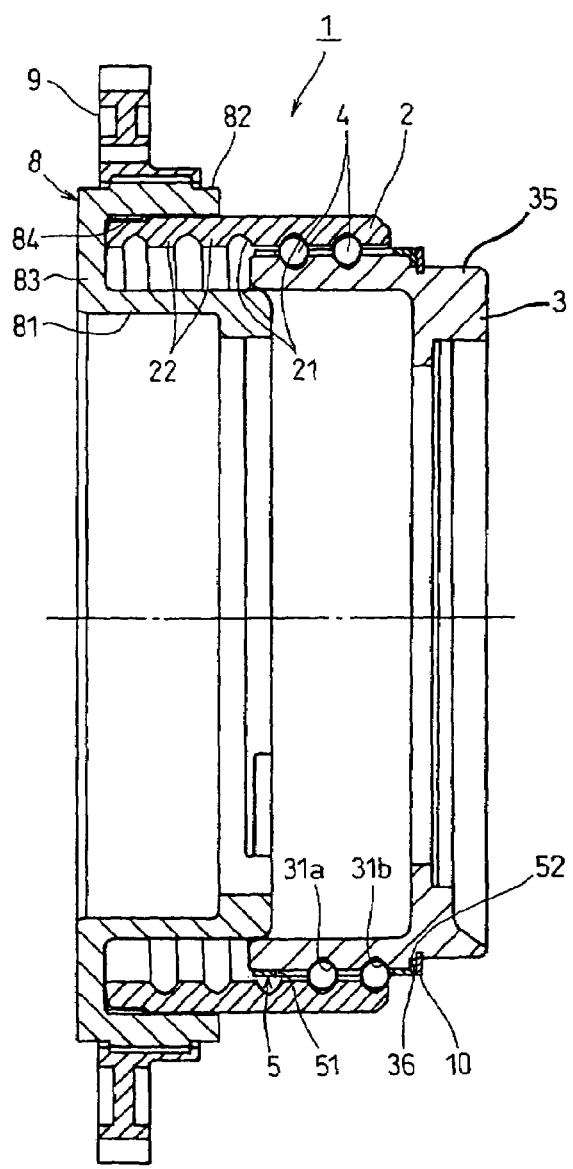
FIG. 3B is a side view in section showing a nut and a screw shaft having been relatively extended away from one another and taken along III-III line of FIG. 2.
Figure 4:
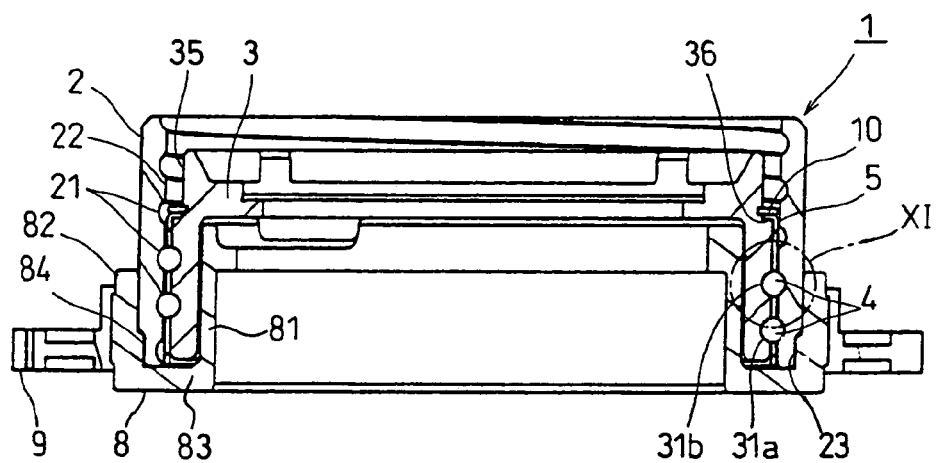
FIG. 4 is a sectional view taken along IV-IV line of FIG. 2.
Figure 5:
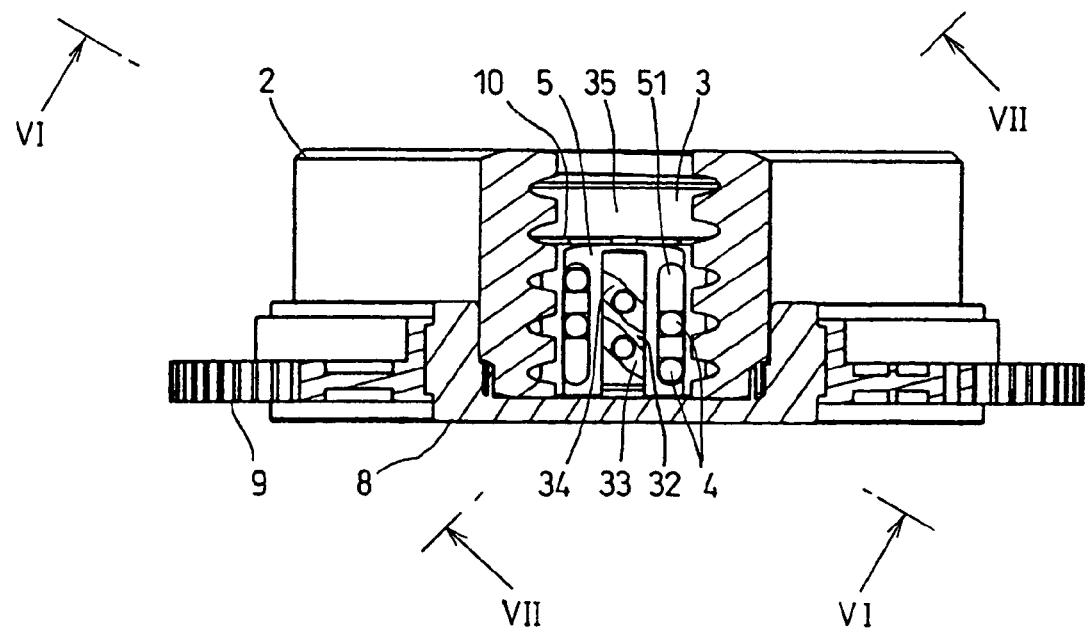
FIG. 5 is a sectional view taken along V-V line of FIG. 2.
Figure 6:
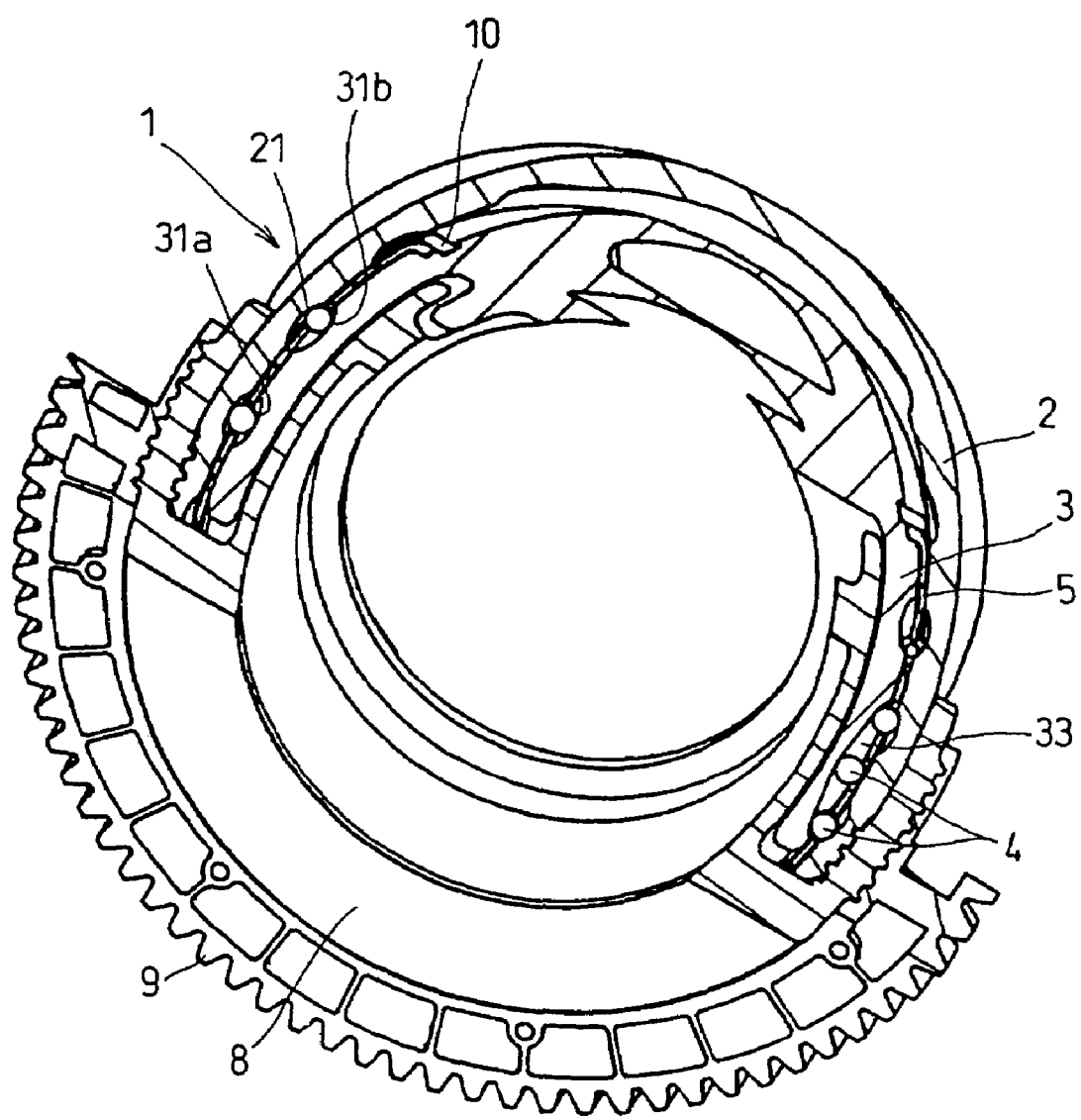
FIG. 6 is a sectional view taken along VI-VI line of FIG. 5.
Figure 7:
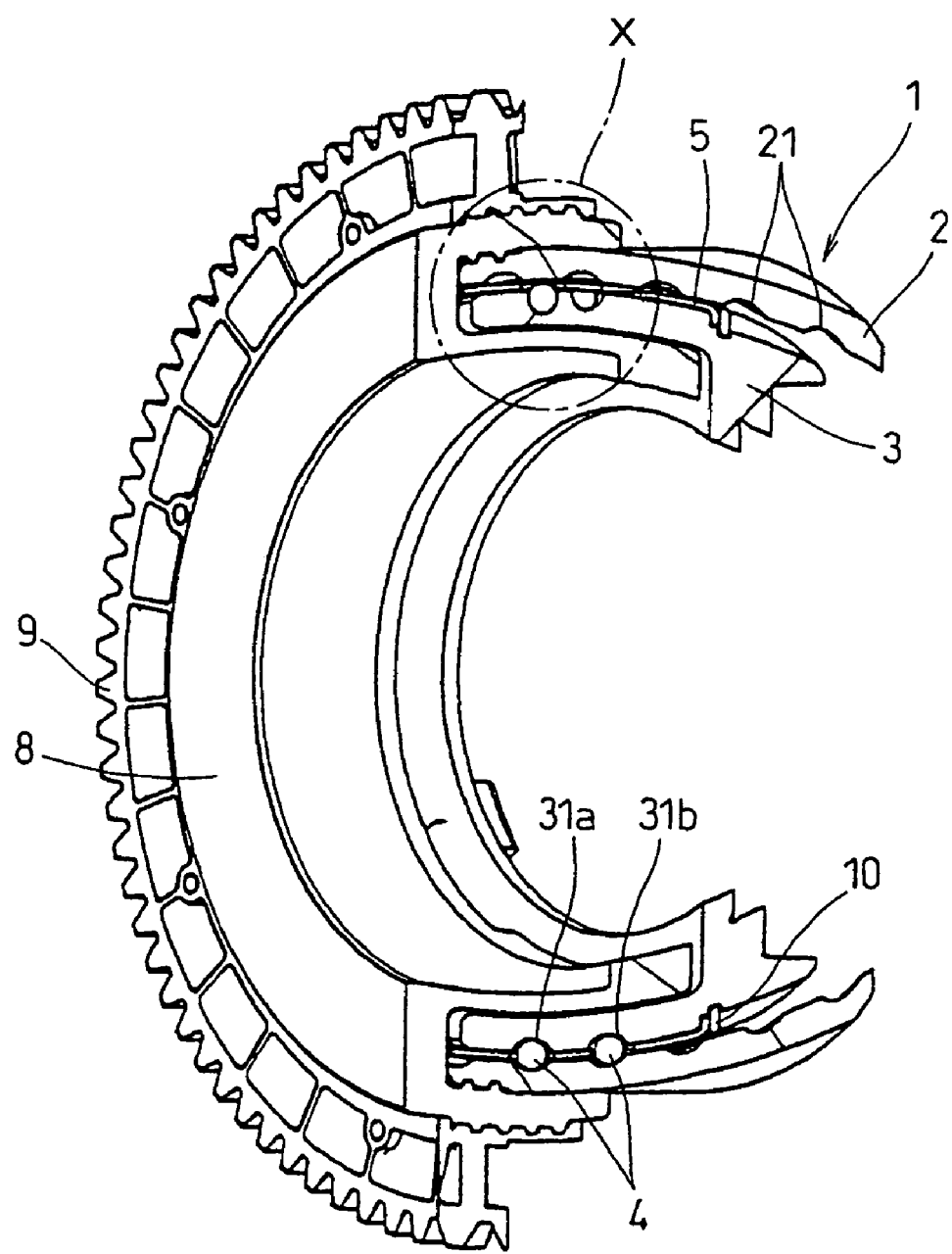
FIG. 7 is a sectional view taken along VII-VII line of FIG. 5.

The thread groove 21 and the thread grooves 31a and 31b respectively of the nut 2 and the screw shaft 3 are set at an identical lead angle. In the nut 2 and the screw shaft 3, when separated away from one another with a maximum distance therebetween as shown in FIG. 3B, their overlapping region is ensured. In the overlapping region are disposed the thread grooves 31a and 31b, in which each of the balls 4 independently roll and thereby circulate.

More specifically, a land, that is a ridge 32, is present axially between the thread grooves 31a and 31b of the screw shaft 3. Two ball circulation grooves 33 and 34 corresponding to the thread grooves 31a and 31b are provided at the ridge 32. The ball circulation grooves 33 and 34 separately couple the upstream side, which the balls roll from, and the downstream side, which the balls roll to, of the corresponding thread grooves 31a and 31b to form closed loops for returning the balls 4 having traveled from the downstream side to the upstream side so that the balls are thereby circulated. The ball circulation grooves 33 and 34 sink the balls 4 on the downstream side of the thread grooves 31a and 31b to the inner diameter side so that the balls travel over the ridge 32 of the nut 2 and return to the upstream side. The term, "substantially one turn", used in the description of the thread grooves 31a and 31b means that they have a length of less than one turn, however close to one turn, and the length should be such as to locate the ball circulation grooves 33 and 34 between the downstream and upstream sides of the thread grooves 31a and 31b.

The retainer ring 5 is formed from a thin cylindrical member and has ball pockets 51 provided at dozens of places on the circumference thereof so that the multiple balls 4 are circumferentially spaced at equal intervals so as not to interfere with one another. The ball pockets 51 have an axially elongated elliptical shape, in each of which two of the balls 4 are axially housed. The ball pockets 51 have an opening dimension larger than the diameter of the balls 4 in a radial direction, which enables the balls 4 to pass through the ball pockets 51 in the radial direction thereof with room to spare.

The nut 2 is integrally combined with a bracket 8. The screw shaft 3 is non-rotatably and axially immovably fitted to a fixed part such as a case, not shown, or the like, while the nut 2 is rotatably and axially movably disposed with respect to the screw shaft 3.

The bracket 8 is made of metal material and includes an axially extending internal cylindrical portion 81, an external cylindrical portion 82 concentric with and radially outward of the internal cylindrical portion 81 and an annular plate portion 83 connecting the internal cylindrical portion 81 with the external cylindrical portion 82 on one axial end side. The internal cylindrical portion 81 is disposed in a central hole of the screw shaft 3 in a non-contact state and supported with respect to a support shaft, not shown, via a rolling bearing, not shown. The external cylindrical portion 82 is integrally engaged with the outer periphery of a region on one axial end side of the nut 2. A serration 84 is provided in the inner peripheral surface on the base side of the external cylindrical portion 82. A serration 23 is provided in the outer peripheral surface on the back side of the nut 2 in the insertion direction thereof. The bracket 8 and the nut 2 are circumferentially combined as a unit in consequence of the serrations 84 and 23 having been engaged with one another. A gear 9 made of resin is integrally formed in the outer peripheral surface of the external cylindrical portion 82.

The screw shaft 3 has a reduced diameter portion 35 on the free end side thereof. The retainer ring 5 has a radially inward flange 52 on one end thereof. The flange 52 of the retainer ring 5 is engaged with the reduced diameter portion 35 of the screw shaft 3. A snap ring 10 is engaged with a peripheral groove provided on the reduced diameter portion 35 of the screw shaft 3. The snap ring 10 is mounted in a position distant from a step wall surface 36 formed on the border of the reduced diameter portion 35 of the screw shaft 3 and where the thread groove 21 is formed. The flange 52 of the retainer ring 5 is disposed between the snap ring 10 and step wall surface 36 with a slight axial play. By doing so the retainer ring 5 is arranged to be substantially axially immovable and relatively rotatable with respect to the screw shaft 3.

Referring to FIG. 8, the ball circulation grooves 33 and 34 are described in more detail. Because the thread grooves 31a and 31b of the screw shaft 3 and the ball circulation grooves 33 and 34 are of identical shape, the thread groove 31a and the ball circulation groove 33 corresponding thereto are described below. The balls 4 in FIG. 8, as shown in a solid line, roll in a thread groove 31a-up (thread groove on the upstream side) in an arrow a direction, while, rolling in a thread groove a' in an arrow b direction. Further, the balls 4, as shown in a solid line, roll in a thread groove 31a-dn (thread groove on the downstream side) on the front side in FIG. 8 in an arrow c direction. The balls 4 are returned from the thread groove 31a-dn on the downstream side to the thread groove 31a-up on the upstream side by the ball circulation groove 33. Thus, the thread groove 31a is formed into a closed loop having coupled the 31a-up on the upstream side and the 31a-dn on the downstream side by the ball circulation groove 33. The balls 4, when rolling in the thread groove 31a, roll between the thread groove 31a and the thread groove 21 of the nut 2, and therefore do not necessarily sink to the inner diameter side. However, when the balls 4 roll in the ball circulation groove 33, as shown in FIG. 3A, the nut 2 side constitutes the ridge 32. Because the ball circulation groove 33, as shown in FIG. 3A, is formed rather deep, the balls 4 are able to sink to the inner diameter side in the ball circulation groove 33 to thereby travel over the nut 2-side ridge 32 and roll into the thread groove 31a-up (thread groove on the upstream side). Referring to the thread groove 31b, a 31b-up on the upstream side and a 31b-dn on the downstream side are coupled by the ball circulation groove 34, which has a depth enough to sink the balls 4 to the inner diameter side.

The assembling steps of the ball screw device 1 are hereby described. First, the retainer ring 5 is mounted on the screw shaft 3. Next, the ball pockets 51 of the retainer ring 5 are coated with grease to the extent of being thereby infilled, and then a required number of the balls 4 are installed in the ball pockets 51. The grease used here preferably has enough viscosity to prevent the balls 4 from falling by their own weight and serves to retain the balls 4 inside the ball pockets 51. When the foregoing steps have been done, the retainer ring 5 is arranged not to rotate with respect to the screw shaft 3 and then incorporated in the nut 2.

The operation of the foregoing ball screw device 1 is hereinafter described. First, the gear 9 is rotated along with the rotation of a motor, and the nut 2 integral with the gear 9 is synchronously rotated. The nut 2 is, being rotated, guided by the screw shaft 3 and linearly moved in one axial direction. As a result, the state of the ball screw device 1 is shifted from, for example, what is shown in FIG. 3A to FIG. 3B. When the motor is rotated in the opposite direction, in response to which, the nut 2 is, being rotated in the opposite direction as well, moved in the opposite axial direction. Accordingly, the state of the ball screw device 1 is shifted from, for example, what is shown in FIG. 3B to FIG. 3A.

Thus, when the nut 2 is axially reciprocated, an axially overlapping region of the nut 2 and the screw shaft 3 changes. The balls 4, while arranged not to slip out, are guided by the retainer ring 5 and circulated in the thread grooves 31a and 31b. The circulation of the balls serves to smoothly guide the nut 2 with respect the screw shaft 3.

In the foregoing, the retainer ring 5 is arranged to be rotated by means of the highly precisely manufactured outer peripheral surface of the screw shaft 3 serving to control the rotational wobble of the retainer ring 5 itself in the axial reciprocation of the nut 2 and also to avoid the interference by the retainer ring 5 with the balls 4. This greatly contributes to the behavior of the balls 4 and the smooth operation of the nut 2, by, for example, decreasing the possibility that the balls 4, due to their slipping, move at an erratic rate, or the like. Thus, the ball screw device 1 is capable of circulating the balls without using a deflector.

The ball circulation grooves 33 and 34, as shown in FIG. 8, are provided in a substantially identical phase and axially adjacent to one another, and therefore the thread grooves 31a and 31b of the screw shaft 3 are axially closely spaced. Consequently, an area axially occupied by the ball circulation grooves 33 and 34 is reduced. In this case, the balls 4 disposed in the ball circulation grooves 33 and 34 can be subject to neither a radial load nor an axial load, and therefore providing two ball circulation grooves 33 and 34 circumferentially and axially in the vicinity will create a non-load bearing area in a predetermined angle on the circumference of the thread grooves 31a and 31b. In this respect, having shortened the axial dimensions of the nut 2 and the screw shaft 3 and set the outer diameters thereof at a larger value, as shown in FIG. 9, an angle θ of the region where the ball circulation grooves 33 and 34 are present on the circumference of the thread grooves 31a and 31b, can be small. A smaller number of the balls 4 are, therefore, required to be disposed in the ball circulation grooves 33 and 34. Accordingly, the decrease of load bearing performance is controlled to consequently eliminate any possible trouble in practical use.

In addition to the above advantages, it becomes unnecessary to attach a return tube or deflector to the nut 2 as in the conventional products. It also becomes unnecessary to form an axially penetrating ball circulation passageway in the nut 2 as in a structure where balls are circulated with a well-known end cap. This is further advantageous in that the nut 2 can be made thinner and the outer diameter of the entire ball screw device 1 can be reduced.

In the screw shaft 3, the thread grooves 31a and 31b are only provided in a predetermined length in an axially intermediate position thereof, while the both axial end sides thereof have no thread grooves. Hence, the degree of freedom in design is enhanced, such as being able to variously design the shapes of the inner and outer diameter portions on the both axial end sides of the screw shaft 3. As an example, not shown, thread grooves are not provided on the both axial end sides of the screw shaft 3, wherein at least one axial end side of the screw shaft 3 can be thinner and reduced in weight having enough strength. As another example, not shown either, the outer diameter of the screw shaft 3 on at least one axial end side thereof can be reduced, and the reduced diameter portion can be supported by a case or the like. Further, instead of the snap ring 10, the outer diameter of the screw shaft 3 on at least one axial end side thereof may be enlarged. Alternatively, the snap ring 10 and the large diameter portion of the screw shaft 3 in combination may be used.

In the case of the ball screw device 1, there are: a first mode of use, wherein one of the nut 2 and the screw shaft 3 is rotated to have the other axially move; a second mode of use, wherein one of the nut 2 and the screw shaft 3 is axially moved to have the other rotate. The first mode of use is referred to as a forward efficiency for converting a torque into a thrust. The second mode of use is referred to as a reverse efficiency for converting a thrust into a torque.

In the first mode of use, as a first example, the nut 2 is, being rotated, axially moved. In this case, the screw shaft 3 is arranged to be non-rotatable and axially immovable to rotate the nut 2. As a second example, the nut 2 is axially moved in the non-rotatable manner. In this case, the screw shaft 3 is arranged to be axially immovable, while the nut 2 is arranged to be non-rotatable, to rotate the screw shaft 3. As a third example, the screw shaft 3 is, being rotated, axially moved. In this case, the nut 2 is arranged to be non-rotatable and axially immovable to rotate the screw shaft 3. As a fourth example, the screw shaft 3 is axially moved in the non-rotatable manner. In this case, the screw shaft 3 is arranged to be non-rotatable, while the nut 2 is arranged to be axially immovable, to rotate the nut 2.

In the second mode of use, as a first example, the nut 2 is rotated in the axially immovable manner. In this case, the nut 2 is arranged to be axially immovable, while the screw shaft 3 is arranged to be non-rotatable to have the screw shaft 3 axially move. As a second example, the nut 2 is, being axially moved, rotated. In this case, the screw shaft 3 is arranged to be axially immovable and non-rotatable to have the nut 2 axially move. As a third example, the screw shaft 3 is rotated in the axially immovable manner. In this case, the screw shaft 3 is arranged to be axially immovable, while the nut 2 is arranged to be non-rotatable to have the nut 2 axially move. As a fourth example, the screw shaft 3 is, being axially moved, rotated. In this case, the nut 2 is arranged to be axially immovable and non-rotatable, to have the screw shaft 3 axially move.

Figure 10:
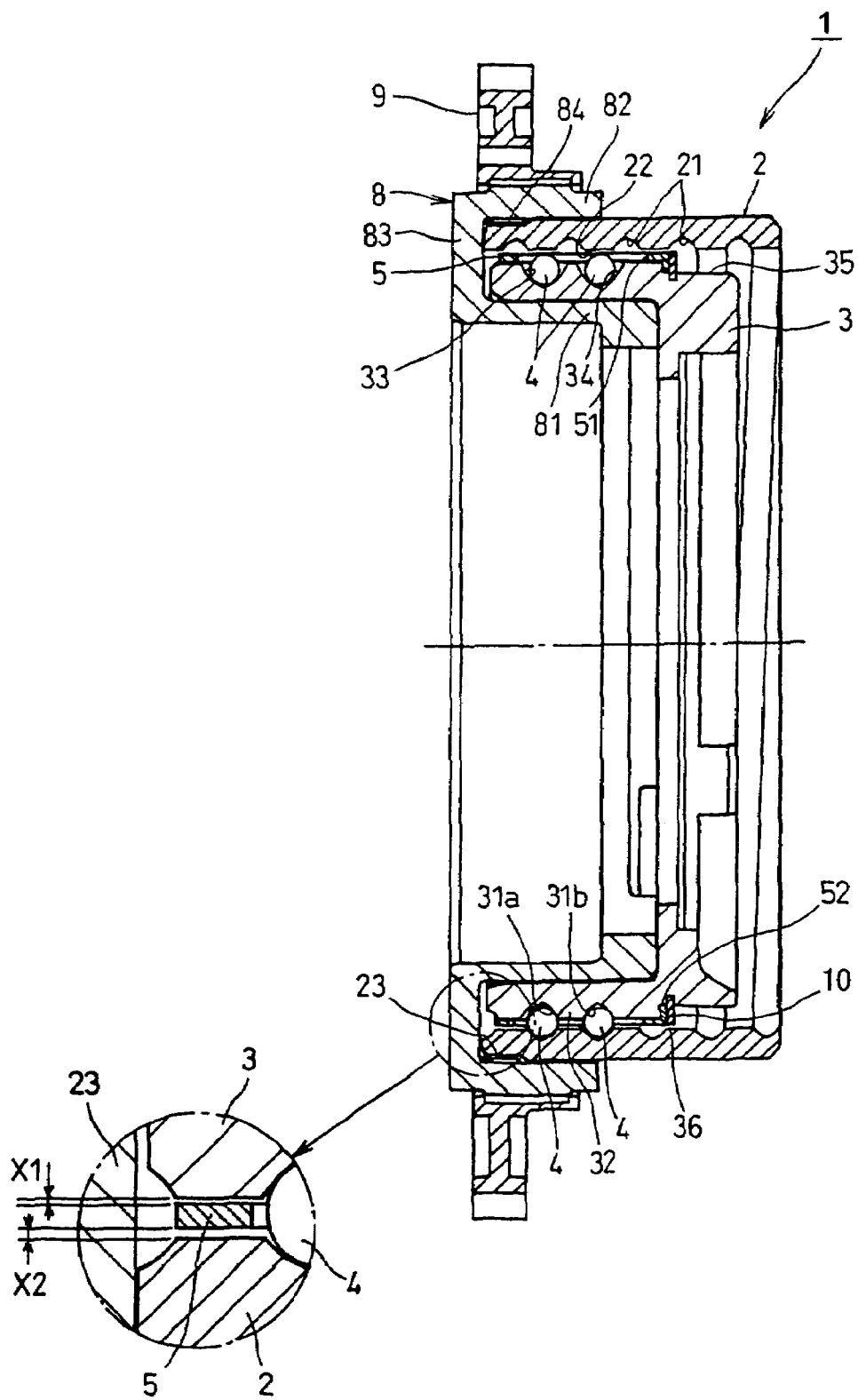
FIG. 10 is a sectional view of a ball screw device according to another embodiment of the present invention.
Figure 11:
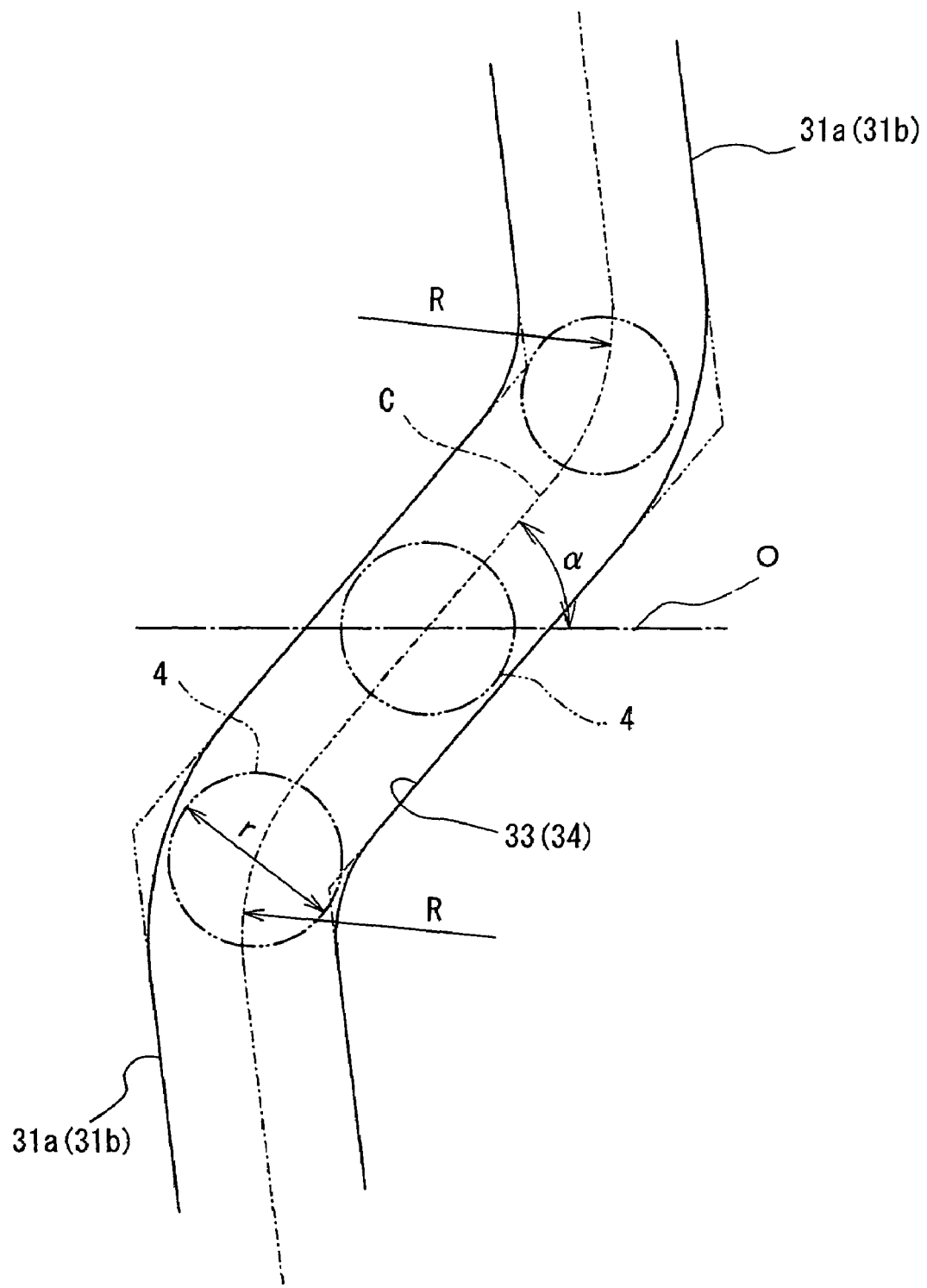
FIG. 11 is a developed plan view of the ball circulation groove of the screw shaft shown in FIG. 10.
Figure 12:
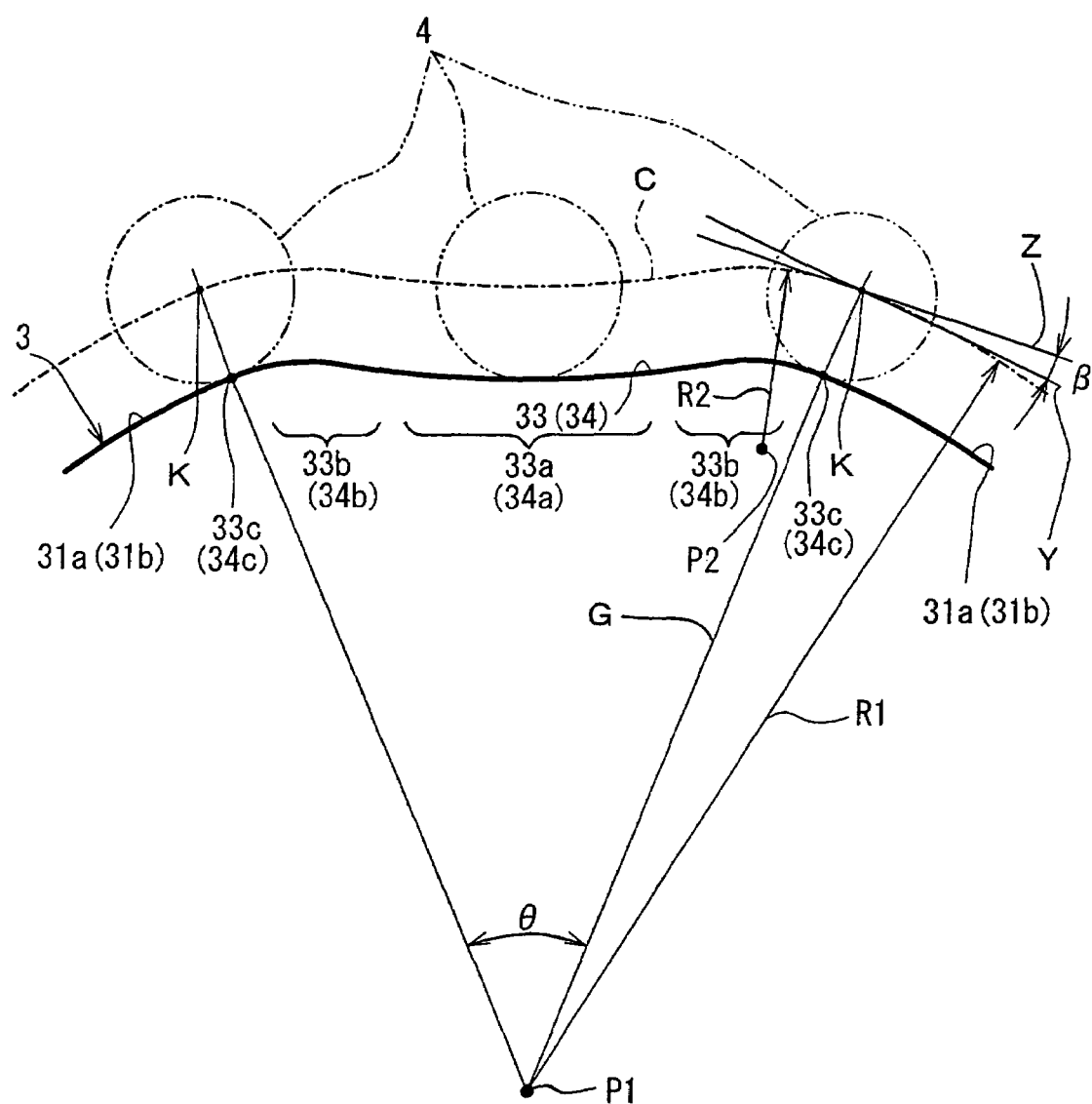
FIG. 12 is a side view of the ball circulation groove shown in FIG. 11.

More detailed description follows referring to FIGS. 10 through 12. Because the retainer ring 5 is rotated by the screw shaft 3, an inner diameter clearance X1 between the retainer ring 5 and the screw shaft 3 is set at a value smaller than an outer diameter clearance X2 between the retainer ring 5 and the nut 2, as shown in FIG. 10. The inner diameter clearance X1 is set at, for example, 0.1-0.4 mm. The outer peripheral surface of the screw shaft 3, which guides the retainer ring 5, is usually processed to have circularity of 0.1 and surface roughness of 1.6 Ra. The circularity is a ratio of a difference between a largest outer diameter and a smallest outer diameter with respect to a designated outer diameter, and Ra is an arithmetic average roughness, both stipulated in the Japan Industrial Standard (JIS).

The thread grooves 31a and 31b of the screw shaft 3 and the ball circulation grooves 33 and 34 share a common shape. Therefore, one of the thread grooves, 31a, and the ball circulation groove 33 corresponding thereto are hereinafter described.

In this embodiment, in order for the balls 4 to enter and exit smoothly between the thread groove 31a and the ball circulation groove 33, the shapes of the ball circulation groove 33 and the portion connecting the thread groove 31a of the screw shaft 3 with the ball circulation groove 33 are formed as follows.

Focusing on the smooth entry and exit of the balls 4 between the thread groove 31a and the ball circulation groove 33, it is desirable for the circumferential length of the ball circulation groove 33, that is an occupation angle θ shown in FIG. 9, to be relatively larger. However, in the respect that the balls 4 disposed in the ball circulation groove 33 can be subject to neither a thrust load nor radial load, it is preferable for the circumferential length of the ball circulation groove 33, that is the occupation angle θ shown in FIG. 9, to be relatively smaller. It is required that the ball circulation groove 33 be designed on the basis of the foregoing aspects.

To be more specific, the shapes of the ball circulation grooves 33 and 34 are described as follows by means of a centrode C drawn by the balls 4 when they roll in the ball circulation grooves 33 and 34.

First, an angle α shown in FIG. 11 is set within the range of 45-60 degrees. The angle α refers to a tilting angle of the centrode C drawn by the balls 4 passing through an intermediate region in the rolling direction of the balls in the ball circulation grooves 33 and 34 with respect to a rotational axis O of the screw shaft 3.

The larger the tilting angle α is arranged to be, the more increase is generated in the circumferential length of the ball circulation grooves 33 and 34, in response to which the occupation angle θ shown in FIG. 9 becomes larger. This will reduce a rolling resistance affecting the balls 4, resulting in an improved smoothness of the movement of the balls 4, whereas load capacity for a thrust load or radial load decreases.

The smaller the tilting angle α is arranged to be, the smaller the occupation angle θ of the ball circulation grooves 33 and 34 becomes. This will improve the load capacity, whereas the rolling resistance affecting the balls 4 becomes larger resulting in a reduced smoothness in the movement of the balls 4.

As compared with the foregoing, when the tilting angle α is arranged to be larger, the smoothness in the movement of the balls 4 improves, on the contrary to which the occupation angle θ of the ball circulation grooves 33 and 34 becomes larger resulting in the reduced load capacity. Therefore, the tilting angle α is arranged to be set within the foregoing range (45-60 degrees) in an effort to make it as small as possible so that the occupation angle θ of the ball circulation grooves 33 and 34 are as small as possible so as to increase the load capacity.

Next, the thread grooves 31a and 31b of the screw shaft 3 and the ball circulation grooves 33 and 34 are coupled as smoothly as possible. More specifically, as shown in FIG. 11, the centrode C of the balls 4 passing through the portions connecting the thread grooves 31a and 31b of the screw shaft 3 with the ball circulation grooves 33 and 34 is arranged to be a curved line having curvature radius R of at least 1.8 times as long as a diameter r of the balls 4.

This will reduce the rolling resistance affecting the balls 4 in changing their direction when entering and exiting the ball circulation grooves 33 and 34. Then, the balls 4 can have a smooth axially winding and rolling movement decreasing effectively abrasion of the balls 4 and the ball circulation grooves 33 and 34.

As shown in FIG. 12, the ball circulation grooves 33 and 34 are formed to have such a curved shape as to sink radially inward in intermediate regions 33a and 34a in the rolling direction of the balls 4 and also a shape curved or protruding radially outward, as a predetermined shape, in the both end side regions 33b and 34b. In this case, the both end side regions 33b and 34b may not necessarily have a shape curved radially outward and may be of other predetermined shapes capable of circulating the balls 4 such as a straight and linear shape or some other shape.

Referring to FIG. 12 are described connecting portions 33c and 34c respectively connected to the downstream and upstream sides of the thread grooves 31a and 31b of the screw shaft 3 at the both end side regions of the ball circulation grooves 33 and 34. For reference, FIG. 12 shows the semicircular bottom portions of the ball circulation grooves 33 and 34 in section and also shows the balls 4 are in rolling contact with the bottom portions of the ball circulation grooves 33 and 34 for convenient description. When the ball circulation grooves 33 and 34 have a Gothic arc shape in section, the balls 4 are in rolling contact with the side walls of the ball circulation grooves 33 and 34, which, however, is not shown in FIG. 12.

In this embodiment, the connecting portions 33c and 34c and the vicinity thereof are formed to have a predetermined shape so that the centrode of the balls 4 rolling in the both end side regions 33b and 34b of the ball circulation grooves 33 and 34 and the centrode of the balls 4 rolling in the respective downstream and upstream sides of the thread grooves 31a and 31b of the screw shaft 3 satisfy predetermined conditions in connection with circulation of the balls 4.

The predetermined conditions are: whether the ball circulation grooves 33 and 34 are of semicircular shape or Gothic arc shape in section, the centrode of the balls 4 satisfies the following intersecting angle β. The intersecting angle β is the angle at which a first tangent line Y and a second tangent line Z intersects with one another. The first tangent line Y is obtained at an intersection point K of a small arc R2 formed by the centrode C of the balls 4 rolling in the both end side regions 33b and 34b of the ball circulation grooves 33 and 34 with respect to a large arc R1 formed by the centrode C of the balls 4 rolling in the thread grooves 31a and 31b, and the second tangent line Z is obtained at the interesection point K with respect to the small arc R2. In this embodiment, the intersecting angle β is set at a degree larger than 0 (zero) degree and at most 30 degrees, or preferably at most 20 degrees. The intersecting angle β is 0 degree when a center of curvature P2 of the small arc R2 is disposed on a straight line G connecting a center of curvature P1 of the large arc R1 with the intersection point K. The connecting portions 33c and 34c are formed in a shape satisfying the intersecting angle β.

Thus, when the connecting portions 33c and 34c connecting the ball circulation grooves 33 and 34 with the thread grooves 31a and 31b of the screw shaft 3 are arranged to have a shape satisfying the intersecting angle β, the radial displacement of the balls 4, in entering and exiting between the thread grooves 31a and 31b of the screw shaft 3 and the ball circulation grooves 33 and 34, can be reduced enabling the smooth entry and exit of the balls 4.

For comparison, when the intersecting angle β is set larger than 30 degrees, the shapes of the connecting portions 33c and 34c in the ball circulation grooves 33 and 34 turn out to be precipitous, in consequence of which the balls 4 unfavorably undergo a larger radial displacement when rolling in the ball circulation grooves 33 and 34. Moreover, the screw shaft 3 is hardened after the ball circulation grooves 33 and 34 and the thread grooves 31a and 31b of the screw shaft 3 have been formed to be finally finished by polishing or grinding, and the foregoing condition is particularly unfavorable in the polishing step as follows. In the polishing step, a polishing tool is arranged to be in contact with the thread grooves 31a and 31b of the screw shaft 3, and then the screw shaft 3 is rotated. The polishing tool, while having a contact with the thread grooves 31a and 31b of the screw shaft 3, does not contact the ball circulation grooves 33 and 34, wherein the ball circulation grooves 33 and 34 cannot be polished. Under the circumstances, in the case in which the connecting portions 33c and 34c are formed in such a shape as to enlarge the intersecting angle β to more than 30 degrees, the connecting portions 33c and 34c result in having an acute tip portion. When the connecting portions 33c and 34c are formed in such a shape as to reduce the intersecting angle β to at most 30 degrees, the connecting portions 33c and 34c result in having a round tip portion. In summary, the intersecting angle β can also serve as a requisite for not creating an edge in the connecting portions 33c and 34c connecting the ball circulation grooves 33 and 34 with the thread grooves 31a and 31b of the screw shaft 3 in the polishing step.

As described, the occupation angle θ of the ball circulation grooves 33 and 34, that is an area incapable of bearing a load, is arranged to be as small as possible, in response to which the load capacity is arranged to be as large as possible, and then a rolling resistance affecting the balls 4 rolling in the ball circulation grooves 33 and 34 is arranged to be as small as possible so that the balls 4 consequently roll as smoothly as possible. Thus, the load capacity and the smoothness of movements can be combined in a well-balanced manner in the ball screw device.

The foregoing description applies to the relationship between the thread groove 31b of the screw shaft 3 and the ball circulation groove 34.

OTHER EMBODIMENTS OF THE INVENTION

1) Referring to FIGS. 13 through 16 are described another embodiment of the present invention.

Figure 13:
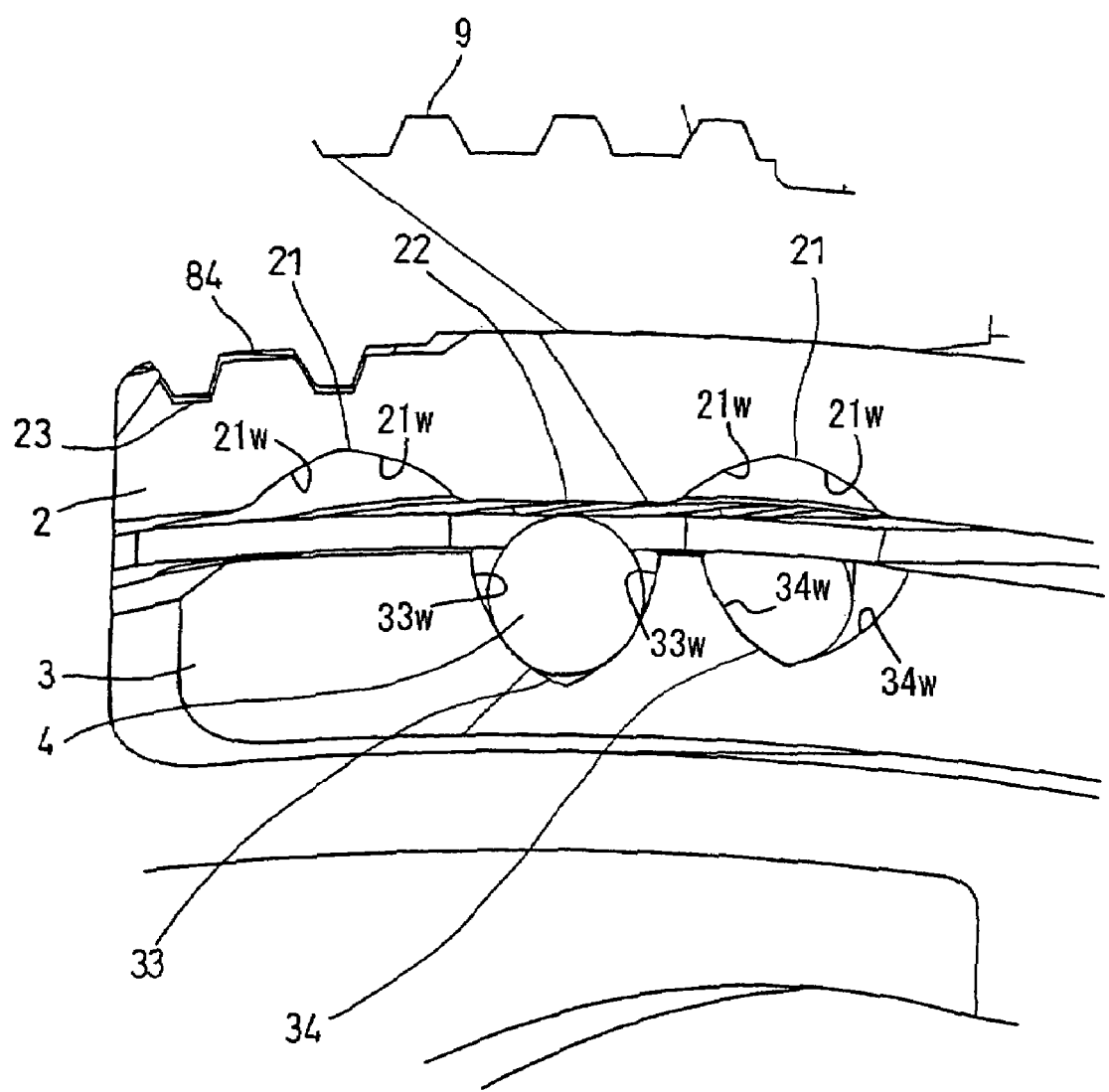
FIG. 13 is an enlarged view corresponding to X portion shown in FIG. 7.
Figure 14:
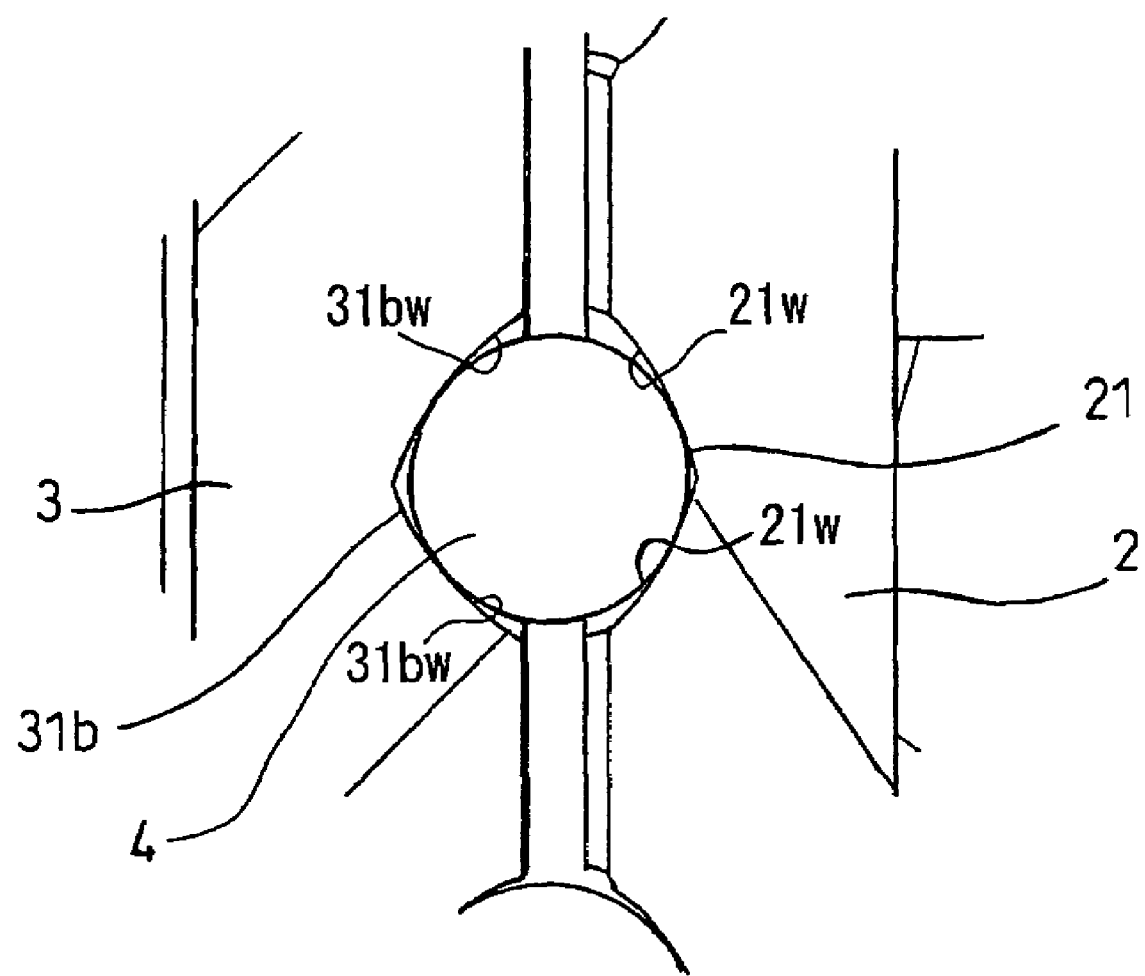
FIG. 14 is an enlarged view corresponding to XI portion shown in FIG. 4.

As shown in FIGS. 13 and 14, the section of any of a thread groove 21 of a nut 2, thread grooves 31a and 31b of a screw shaft 3, and ball circulation grooves 33 and 34 is of Gothic arc shape, in which right and left circular side walls are sharply thinned and continuous at the groove bottom portions. 21ws are the right and left side walls of the thread groove 21 of the nut 2, 31bws are the right and left side walls of the thread groove 31b, 33ws are the right and left side walls of the ball circulation groove 33, and 34ws are the right and left side walls of the ball circulation groove 34. The right and left side walls of the thread groove 31a are not shown, but are the same as those of the thread groove 31b.

In this configuration, when balls 4, at the time of circulating, move from the thread grooves 31a and 31b of the screw shaft 3 (downstream sides 31a-dn and 31b-dn) to the ball circulation grooves 33 and 34, the contacting points of the balls 4 and the ball circulation grooves 33 and 34 are near the openings of the ball circulation grooves 33 and 34. Therefore, the balls 4 are affected by a force in the direction where they sink to the ball circulation grooves 33 and 34, which prevents the balls 4 from running on and getting stuck at the ridge 32 of the screw shaft 3 resulting in smooth circulation of the balls 4.

Figure 15:
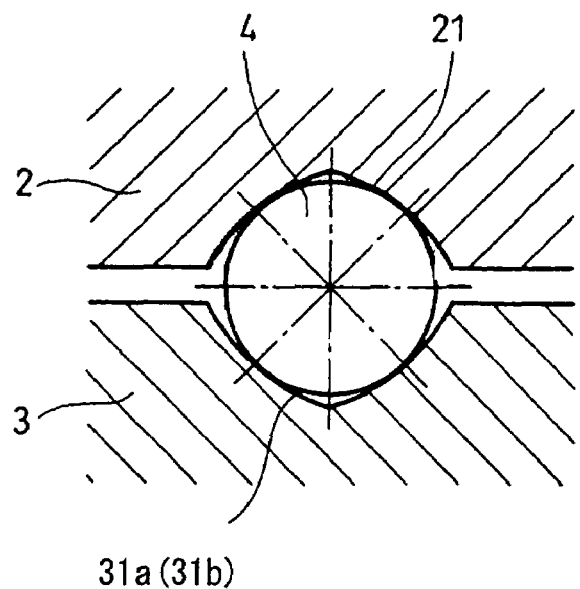
FIG. 15 is a sectional view showing the movement of balls disposed in a thread groove of a screw shaft.
Figure 16:
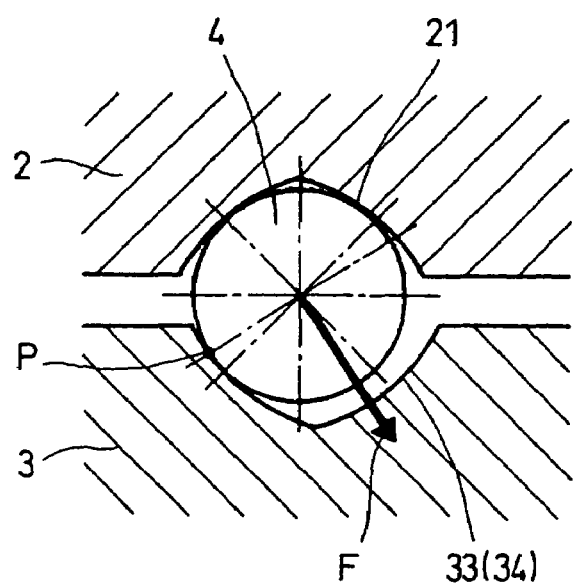
FIG. 16 is a sectional view showing the movement of balls disposed in a ball circulation groove.

Referring to FIGS. 15 and 16 for detailed description, first, when the balls 4 are in the thread grooves 31a and 31b of the screw shaft 3, the balls 4 and the thread grooves 31a and 31b contact with one another at the contacting angle of 45°, as shown in FIG. 15. Then, when the balls 4 have moved to the ball circulation grooves 33 and 34, a contacting point P of the balls 4 and the ball circulation grooves 33 and 34, which was originally made at the contacting angle of 45° in FIG. 15, moves slowly to near the openings of the ball circulation grooves 33 and 34 (shallower side of the grooves), as shown in FIG. 16. As a result, the balls 4 are affected by a force F in the direction where they sink to the ball circulation grooves 33 and 34.

According to the ball screw device having the described structure, downstream sides 31a-dn and 31b-dn and upstream sides 31a-up and 31b-up of the thread grooves 31a and 31b of the screw shaft 3 are coupled by the ball circulation grooves 33 and 34 to form closed loops. Thus, the balls 4 having rolled to the downstream sides 31a-dn and 31b-dn of the thread grooves 31a and 31b are sunk to the inner diameter side to travel over the ridge 22 of the nut 2 so that they are guided to the upstream sides 31a-up and 31b-up to be thereby circulated.

With the ball circulation grooves 33 and 34 being formed in a Gothic arc shape in section, when the balls 4, at the time of circulating, move from the thread grooves 31a and 31b of the screw shaft 3 to the ball circulation grooves 33 and 34, the contacting point P of the balls 4 and the ball circulation grooves 33 and 34 is near the openings of the ball circulation grooves 33 and 34. For this reason, the force F affects the balls 4 in the direction where they sink into the ball circulation grooves 33 and 34, which prevents the balls 4 from running on and getting stuck at the ridge 32 of the screw shaft 3 resulting in smooth circulation of the balls 4.

Further, to employ the retainer ring 5 for retaining the balls 4 prevents interference between the balls 4 in the thread grooves 21, 31a and 31b and provides the smooth relative rotation between the nut 2 and the screw shaft 3.

The thread grooves 31a and 31b of the screw shaft 3 may not necessarily be two, and can be one, three or more. The ball circulation grooves 33 and 34 may be arranged axially adjacent to one another or in a circumferentially different phase.

Figure 17:
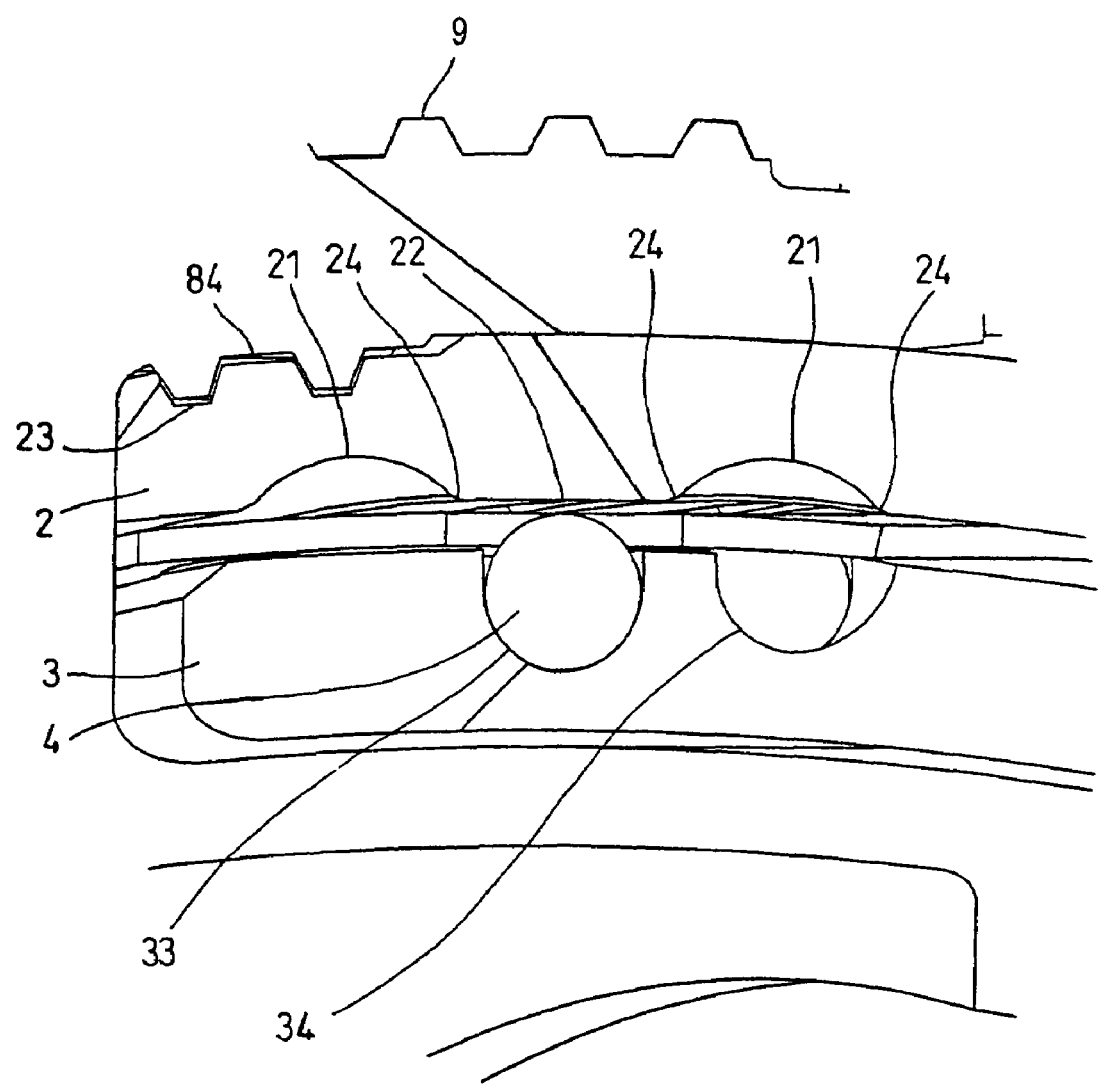
FIG. 17 relates to a main portion of a ball screw device according to still another embodiment of the present invention and is an enlarged view corresponding to X portion shown in FIG. 7.

2) Referring to FIGS. 17 and 18, still another embodiment of the present invention is described. FIG. 17 shows the X portion of FIG. 7 enlarged, and FIG. 18 shows the XI portion of FIG. 4 enlarged. As these figures show, a chamfer 24 is formed along the side edges of a thread groove 21 of a nut 2 to avoid any contact with balls 4 when entering and exiting the ball circulation grooves 33 and 34. The chamfer 24 is formed by turning with a turning tool (cutting tool) or grind stone the entire length of the thread groove 21 along both side edges thereof constituting the border of the thread groove 21 of the nut 2 and a ridge 32. It is preferable to have the chamfer deep, the deeper the better, in terms of safely avoiding any contact with the balls 4. However, too a deep chamfer would make it impossible for the thread groove 21 to guide the balls 4. Due to the problem, the chamfer should be set at a depth in which the balls 4 can be safely guided and any contact with the balls 4 can be safely avoided. In such a structure, the downstream and upstream sides of the thread grooves 31a and 31b of the screw shaft 3 are coupled by the ball circulation grooves 33 and 34 to form closed loops. Then, the balls 4 having rolled to the downstream side of the thread grooves 31a and 31b of the screw shaft 3 are sunk to the inner diameter side to travel over the ridge 32 of the nut 2 so that they are guided to the upstream side of the thread grooves 31a and 31b to be thereby circulated. With the chamfer 24 having been formed along the side edges of the thread groove 21 of the nut 2 for avoiding any contact with the balls 4 at the time of entering and exiting the ball circulation grooves 33 and 34, it can be prevented that the balls 4, at the time of entering and exiting the ball circulation grooves 33 and 34, run on the side edges of the thread groove 21 resulting in smooth circulation of the balls 4.

Figure 19:
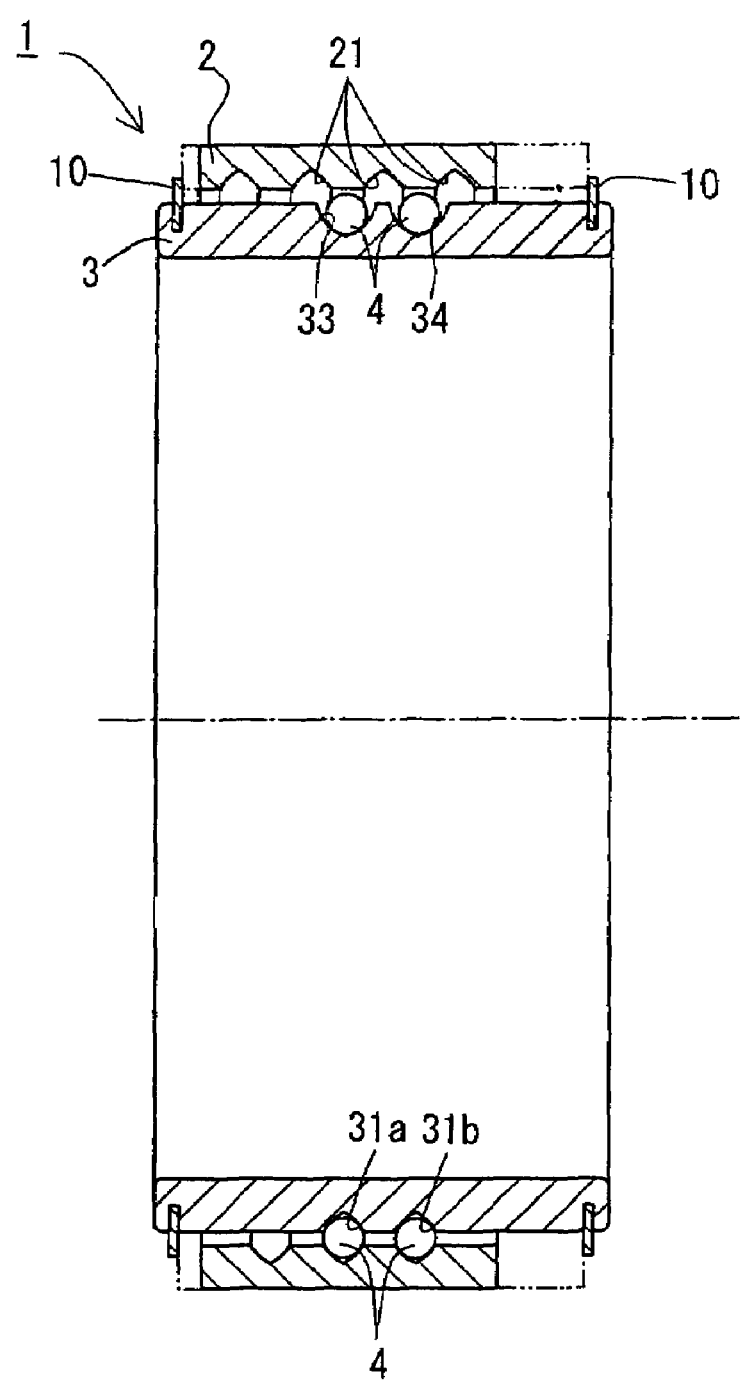
FIG. 19 is a sectional view of a ball screw device according to still another embodiment of the present invention.
Figure 20:
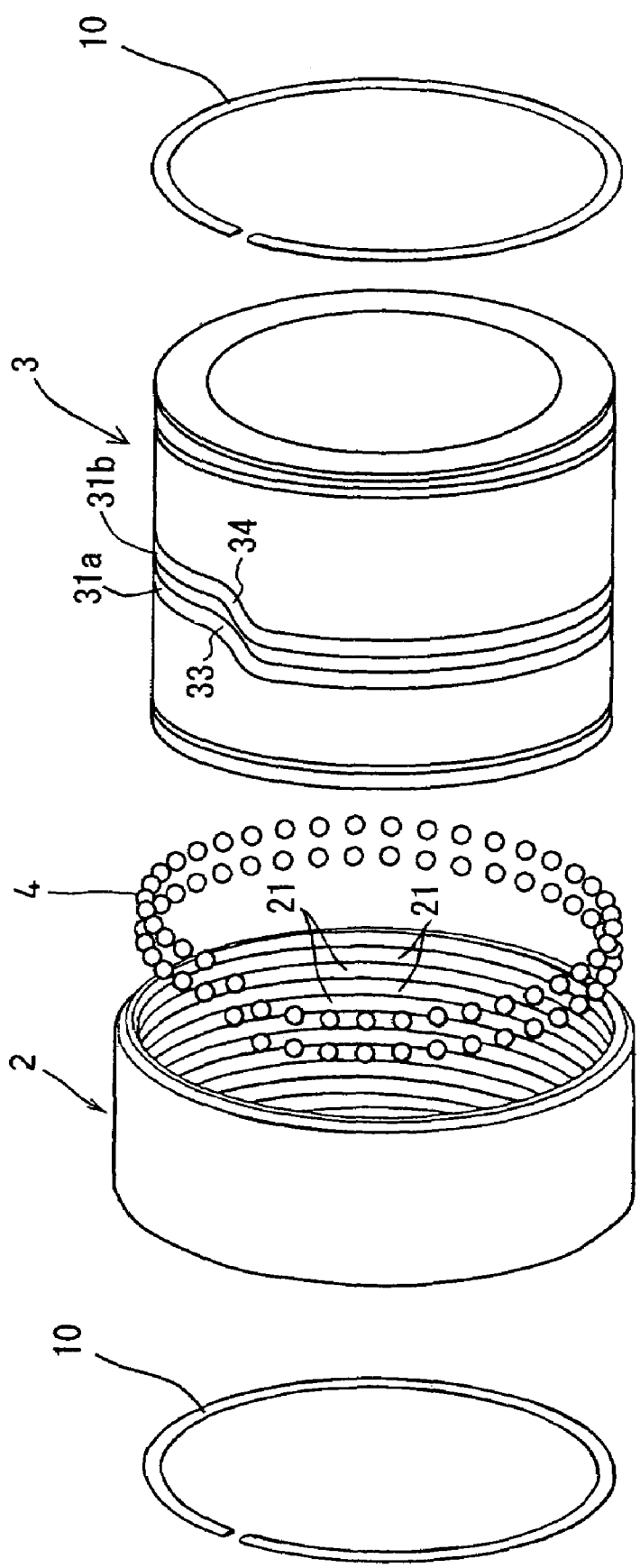
FIG. 20 is a perspective view of the disassembled device shown in FIG. 19.

3) The ball screw device shown in FIGS. 19 and 20 is the type of device with a retainer ring 5 unused therein. The retainer-ring-free ball screw device 1 comprises a nut 2, a screw shaft 3, and a multiplicity of balls 4. The nut 2 has a thread groove 21 formed in the inner peripheral surface thereof, and the screw shaft 3 has thread grooves 31a and 31b formed in the outer peripheral surface thereof. The multiple balls 4 are interposed between the thread groove 21 and the thread grooves 31a and 31b. In the nut 2 is formed the single thread groove 21 continuous from one shaft end to another shaft end. In the axially intermediate region of the screw shaft 3 are formed substantially one turn each of independent thread grooves. The thread groove 21 of the nut 2 and the thread grooves 31a and 31b of the screw shaft 3 are set at an identical lead angle. The thread grooves 21, 31a and 31b are arranged to have a Gothic arc shape in section, but may have a semicircular shape in section. A ridge 32 is present between one of the thread grooves, 31a and the other, 31b.

In such a screw shaft 3 are provided ball circulation grooves 33 and 34, which serve to form the respective thread grooves 31a and 31b into independent closed loops. The ball circulation grooves 33 and 34 respectively couple the upstream and downstream sides of the thread grooves 31a and 31b and have such a meandering shape as to sink the balls 4 on the downstream side of the thread grooves 31a and 31b to the inner diameter side so that the balls 4 travel over the ridge 22 of the nut 2 to be thereby returned to the upstream side. The ball circulation grooves 33 and 34 enable the multiple balls 4 disposed in the respective thread grooves 31a and 31b to independently roll and circulate. The ball circulation grooves 33 and 34 are arranged to have a semicircular shape in section, but may have a Gothic arc shape in section.

Circumferential grooves 35 are respectively provided in the outer peripheral surfaces of the screw shaft 3 on the axial both end sides thereof. The circumferential grooves 35 are respectively engaged with snap rings 10. The outer diameters of the snap rings 10 are set at a value larger than the inner diameter of the nut 2, whereby the snap rings 10 restrict the axial traveling stroke of the nut 2.

The nut 2 is, for example, supported so as to freely rotate, and the screw shaft 3 is mounted in a non-rotatable and axially immovable manner. The nut 2, when rotated, axially slides on the screw shaft 3 between the snap rings 10, as shown in a chain double-dashed line in FIG. 19.

Figure 21:
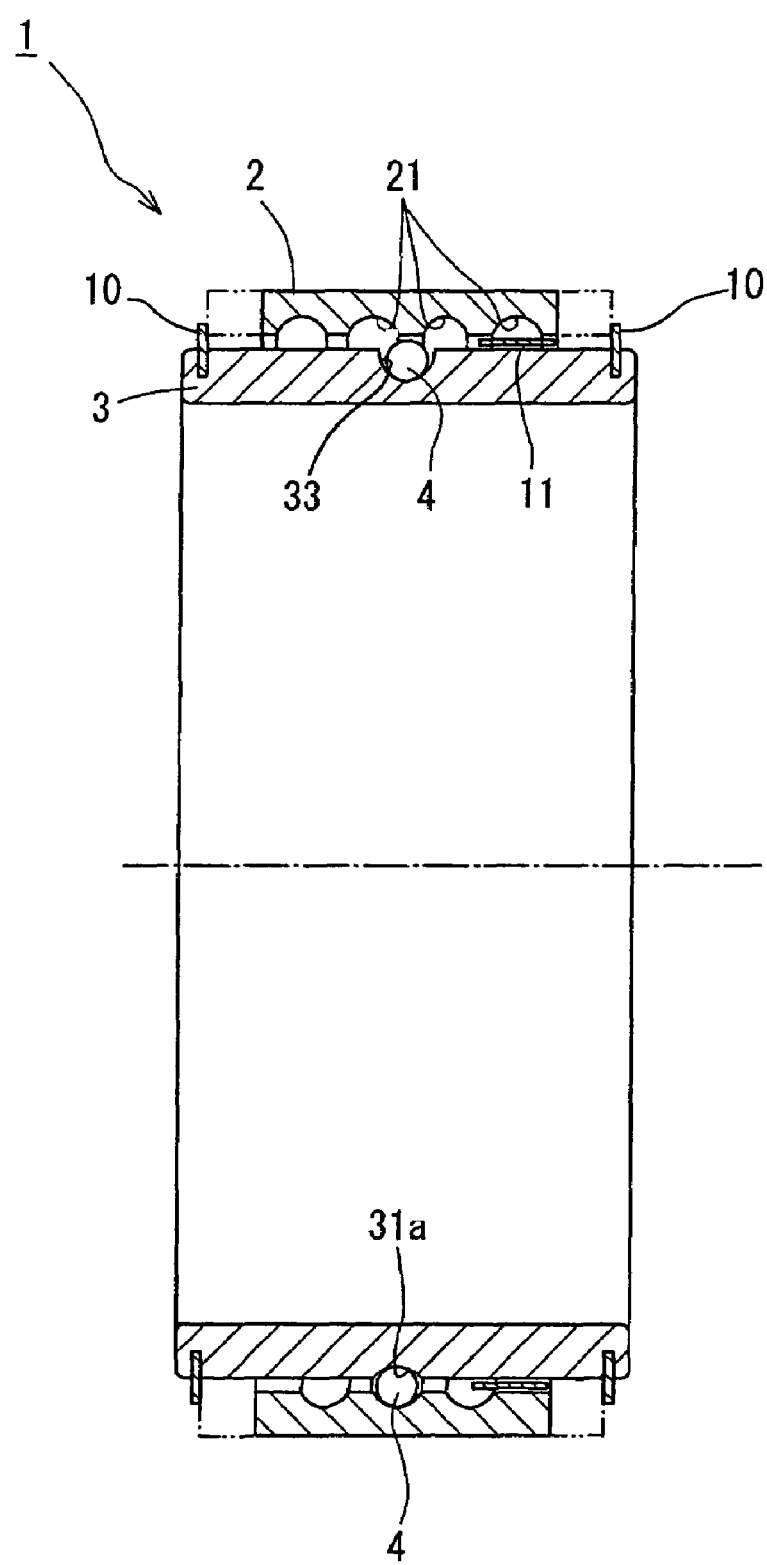
FIG. 21 is a sectional view of a ball screw device according to still another embodiment of the present invention.

In the case of the retainer-ring-free ball screw device, substantially one turn of a thread groove 31a is formed on the screw shaft 3, and the thread groove 31a may be formed into a closed loop by the ball circulation groove 33, as shown in FIG. 21. In this case, when the thread groove 31a of the screw shaft 3, the ball circulation groove 33, and the thread groove 21 of the nut 2 are arranged to have a Gothic arc shape in section, the balls 4 can contact the thread groove 21 of the nut 2 and the thread groove 31a of the screw shaft 3 at four points. This, when a moment load acts on the nut 2, enables the tilting thereof to be controlled.

Figure 22:
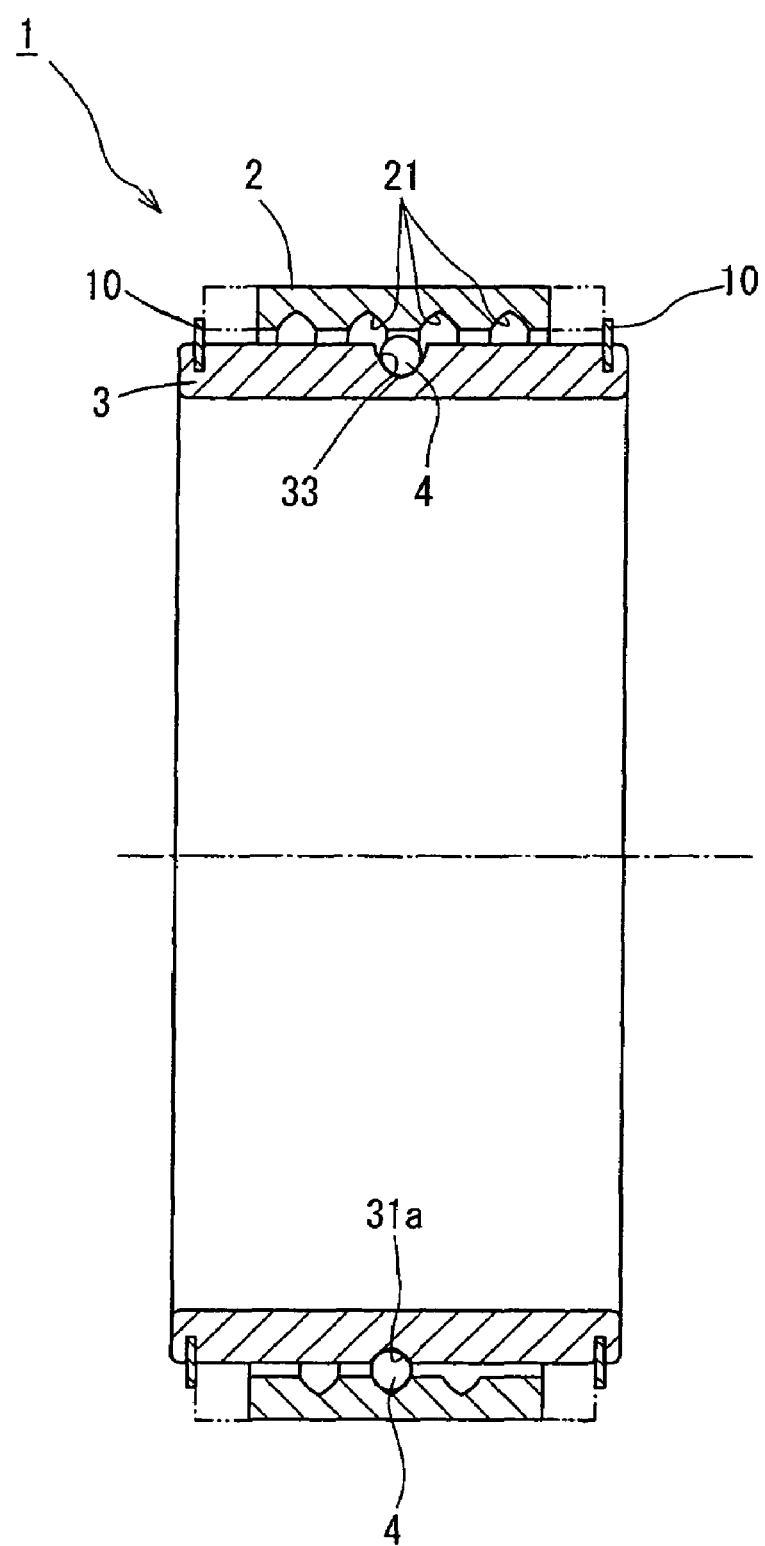
FIG. 22 is a sectional view of a ball screw device according to still another embodiment of the present invention.

In the case of the retainer-ring-free ball screw device, substantially one turn of the thread groove 31a is formed on the screw shaft 3, and the thread groove 31a may be formed into a closed loop by the ball circulation groove 33, as shown in FIG. 22. In this case, the thread groove 31a of the screw shaft 3 and the ball circulation groove 33 may have a semicircular shape in section. In the case of FIG. 22, it is preferable, in the region axially distant from the thread groove 31a, to interpose a slide bearing 11 of cylindrical shape such as a metal or resin bushing or the like on at least one axial end side in an annular space between the nut 2 and screw shaft 3. This, when a moment load acts on the nut 2, enables the tilting thereof to be controlled.

Figure 23:
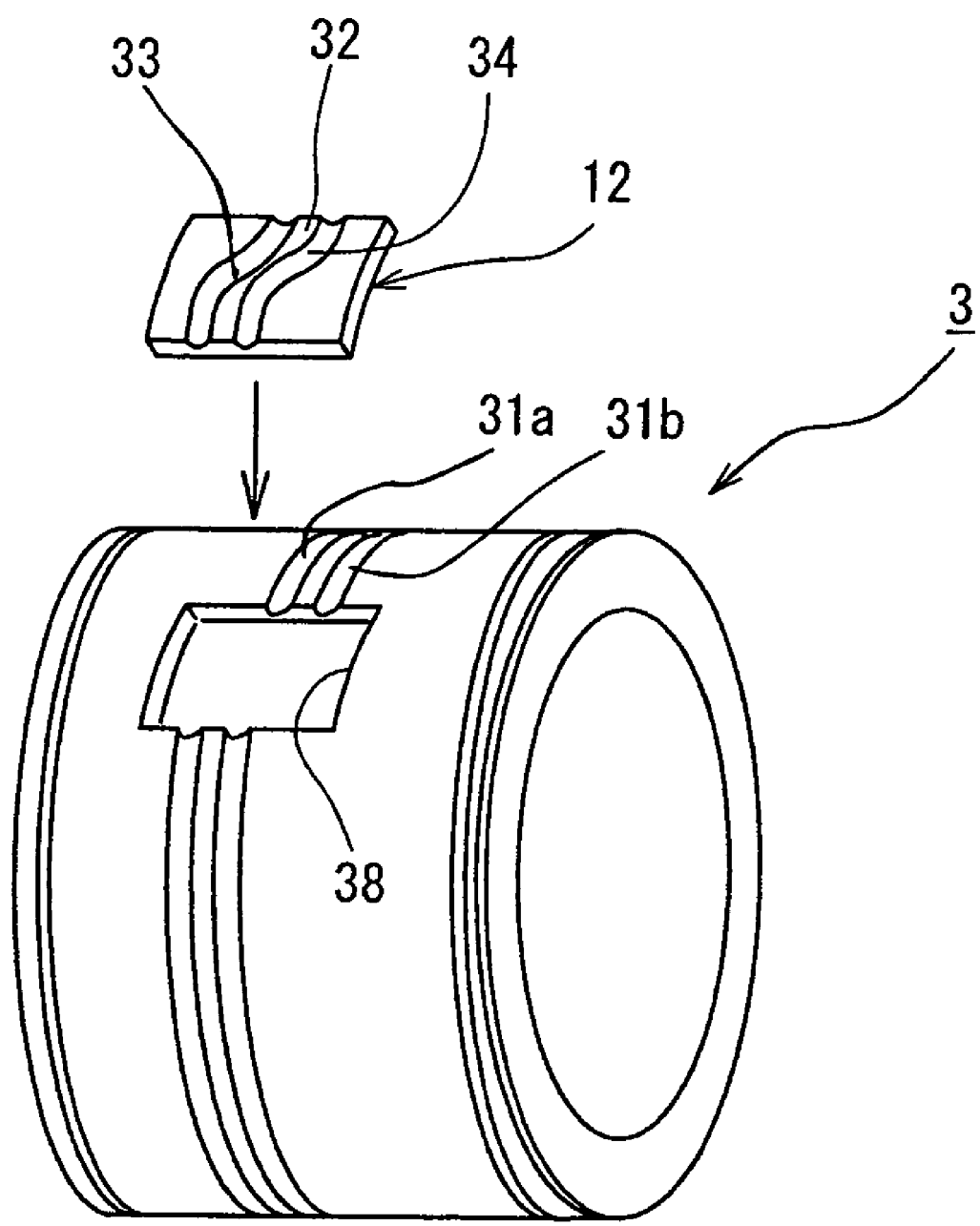
FIG. 23 is a perspective view of a screw shaft of a ball screw device according to still another embodiment of the present invention.

As a possible configuration shown in FIG. 23, a recess portion 38 may be provided in the region of the screw shaft 3, where the ball circulation grooves 33 and 34 are supposed to be formed, while a block 12, on which the ball circulation grooves 33 and 34 have been formed, may be fitted into the recess portion 38.

The block 12, which is mounted on the screw shaft 3 with high precision in contrast to the conventional deflectors to be attached to the nut 2 by an adhesive, can achieve a precise positioning between the ball circulation grooves 33 and 34 and the thread grooves 31a and 31b. The block 12, therefore, does not adversely affect on circulation performance of the balls.

Because the block 12 is smaller than the screw shaft 3, the working step of forming the ball circulation grooves 33 and 34 thereon can be simplified compared to forming the ball circulation grooves 33 and 34 directly in the outer peripheral surface of the screw shaft 3. When the ball circulation grooves 33 and 34 are worn or damaged, it is unnecessary to replace the screw shaft 3, only requiring the replacement of the block 12. The recess portion 38 may be a through opening.

INDUSTRIAL APPLICABILITY

The present invention can be applied to a method of converting a rotational movement into a linear movement and vise versa in machine tools, semiconductor devices, precision position tables, robots and conveying equipment.

The invention claimed is:

1. A ball screw device comprising:
   a screw shaft having substantially one turn of at least one thread groove provided in an outer peripheral surface thereof;
   a nut externally mounted on the screw shaft and having a thread groove provided in an inner peripheral surface thereof at an angle substantially identical to that of the thread groove; and
   a plurality of balls interposed between the respective thread grooves, wherein a ball circulation groove for coupling downstream and upstream sides of the thread groove of the screw shaft are provided on the screw shaft so that the balls are returned from the downstream side to the upstream side to be thereby circulated in the thread groove of the screw shaft, the ball circulation groove has an intermediate region in a direction of rolling balls having such a curved shape as to sink radially inward and both end side regions positioned on both sides of the intermediate region and having a predetermined shape, and the ball circulation groove configured in the manner in that a centrode of the balls rolling in the both end side regions and a centrode of the balls rolling in the thread groove of the screw shaft satisfy predetermined conditions with respect to the circulation of the balls,
   wherein the predetermined conditions are that an angle, at which a first tangent line obtained at an intersection point of a small arc formed by the centrode of the balls rolling in the both end regions of the ball circulation groove with respect to a large arc formed by the centrode of the balls rolling in the thread groove of the screw shaft intersects with a second tangent line obtained at the intersection point with respect to the small arc, is set at a degree larger than 0 degree and at most 30 degrees.

2. A ball screw device as claimed in claim 1, wherein the both end side regions of the ball circulation groove have a shape protruding radially outward.

3. A ball screw device as claimed in claim 1, wherein in the screw shaft is provided substantially one turn each of two independent thread grooves and two ball circulation grooves, corresponding to the respective thread grooves of the screw shaft, for separately coupling the respective downstream and upstream sides of the thread grooves; and
   the respective ball circulation grooves are disposed in a substantially identical phase in an axial direction.

4. A ball screw device as claimed in claim 1, wherein a retainer ring for rotatably retaining the balls is mounted on an outer periphery of the screw shaft so as to relatively rotate with respect to the screw shaft in an axially fixed position.

5. A ball screw device as claimed in claim 1, wherein any of the thread groove of the screw shaft, the thread groove of the nut and the ball circulation groove has a Gothic arc shape in section.

6. A ball screw device as claimed in claim 1, wherein a chamfer for avoiding contact with the balls when entering and exiting the ball circulation groove is formed on side edges of the thread groove of the nut.

7. A circulating ball screw device comprising:
   a screw shaft defining a shaft axis and having a shaft thread groove extending from an upstream side end to a downstream side end, said upstream end and said downstream end defining an occupation angle with respect to said shaft axis which is greater than 0 such that said shaft thread groove extends less than one turn;
   a nut mounted on the screw shaft and having and inner cylindrical surface and an internal nut thread groove formed into said inner cylindrical surface and pitched corresponding to said shaft thread groove;
   balls interposed between the shaft thread groove and the nut thread groove;
   said shaft thread groove guiding said balls from said upstream side end to said downstream side end such that a centrode path of travels of said balls is a first arc about an axis of said screw shaft at a radius R1 rotated about a center P1 at said shaft axis;
   a ball circulation groove disposed in said screw shaft for coupling said downstream and upstream side ends of the shaft thread groove so that the balls are returned from the downstream side end to the upstream side end to be thereby circulated in the shaft thread groove;
   the ball circulation groove having an intermediate region and first and second end side regions connecting first and second ends of said intermediate region respectively to said downstream and upstream side ends of the shaft thread groove;
   said intermediate region including a curved concave shaped contour;
   said first and second end side regions being configured such that a centrode path of said balls guided by said end side regions travel is a second arc defined by a radius R2 about a center P2 non-coincident with the center P1; and
   said first and end side regions adjoining respective ones of said upstream and downstream side ends such that at an arc intersection of said first and second arcs, first and second lines are defined wherein said first line is tangent to said first arc and said second line is tangent to said second arc, and said first and second lines defining an angle β greater than 0 and less than or equal to 30°.

8. The circulating ball screw device according to claim 7, wherein said intermediate region is configured such that a centrode path of travel of said balls therein defines an angle α with respect to said shaft axis which is in the range of 45° to 60°.

9. The circulating ball screw device according to claim 8, wherein said first and second end regions are configured such that a centrode C of said balls passing therethrough is a curved line having curvature radius R of at least 1.8 times as long as a diameter r of said balls.

10. The circulating ball screw device according to claim 9, further comprising a retainer ring rotatably retaining said balls mounted on an outer periphery of the screw shaft to relatively rotate with respect to the screw shaft in an axially fixed position.

11. The circulating ball screw device according to claim 10, wherein any of the shaft thread groove and the nut thread groove and the ball circulation groove has a Gothic arc shape in cross section.

12. The circulating ball screw device according to claim 11, wherein said nut thread groove includes opposing curved wall portions, and chamfers connecting said opposing curved wall portion to said inner cylindrical surface for avoiding contact with the balls when entering and exiting the ball circulation groove.

13. The circulating ball screw device according to claim 12, wherein said first and second lines defining an angle greater than 0 and less than 20°.

14. The circulating ball screw device according to claim 7, wherein said first and second lines defining an angle greater than 0 and less than 20°.

15. The circulating ball screw device according to claim 14, wherein said intermediate region is configured such that a centrode path of travel of said balls therein defines an angle α with respect to said shaft axis which is in the range of 45° to 60°.

16. The circulating ball screw device according to claim 15, wherein said first and second end regions are configured such that a centrode C of said balls passing therethrough a curved line having curvature radius R of at least 1.8 times as long as a diameter r of said balls.

17. The circulating ball screw device according to claim 7, wherein any of the shaft thread groove and the nut thread groove and the ball circulation groove has a Gothic arc shape in cross section.

18. The circulating ball screw device according to claim 17, wherein said nut thread groove includes opposing curved wall portions, and chamfers connecting said opposing curved wall portion to said inner cylindrical surface for avoiding contact with the balls when entering and exiting the ball circulation groove.

19. The circulating ball screw device according to claim 7, wherein said first and second end regions are configured such that a centrode C of said balls passing therethrough is a curved line having curvature radius R of at least 1.8 times as long as a diameter r of said balls.

20. The circulating ball screw device according to claim 7, wherein said nut thread groove includes opposing curved wall portions, and chamfers connecting said opposing curved wall portion to said inner cylindrical surface for avoiding contact with the balls when entering and exiting the ball circulation groove.

* * * * *